(12) United States Patent
Kosonen et al.

(10) Patent No.: US 11,932,992 B2
(45) Date of Patent: Mar. 19, 2024

(54) PAPER SUBSTRATE COMPRISING MODIFIED LOW MOLECULAR WEIGHT PVA WITH FUNCTIONAL VINYL GROUPS

(71) Applicant: UPM-Kymmene Corporation, Helsinki (FI)

(72) Inventors: Harri Kosonen, Lappeenranta (FI); Mikko Rissanen, Espoo (FI); Kuisma Littunen, Lappeenranta (FI); Jaakko Rautalahti, Valkeakoski (FI); Janne Antila, Hämeenlinna (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 421 days.

(21) Appl. No.: 17/280,946

(22) PCT Filed: Oct. 9, 2018

(86) PCT No.: PCT/FI2018/050723
§ 371 (c)(1),
(2) Date: Mar. 29, 2021

(87) PCT Pub. No.: WO2020/074766
PCT Pub. Date: Apr. 16, 2020

(65) Prior Publication Data
US 2021/0340708 A1    Nov. 4, 2021

(51) Int. Cl.
| | | |
|---|---|---|
| *D21H 19/72* | (2006.01) | |
| *C09D 129/14* | (2006.01) | |
| *C09D 183/04* | (2006.01) | |
| *D21H 19/20* | (2006.01) | |
| *D21H 19/32* | (2006.01) | |
| *D21H 19/82* | (2006.01) | |

(52) U.S. Cl.
CPC ........... *D21H 19/72* (2013.01); *C09D 129/14* (2013.01); *C09D 183/04* (2013.01); *D21H 19/20* (2013.01); *D21H 19/32* (2013.01); *D21H 19/82* (2013.01)

(58) Field of Classification Search
CPC ........ D21H 19/72; D21H 19/20; D21H 19/32; D21H 19/82; C09D 129/14; C09D 183/04

USPC ......................................................... 162/137
See application file for complete search history.

(56) References Cited

U.S. PATENT DOCUMENTS

| | | | |
|---|---|---|---|
| 2009/0118424 A1 | 5/2009 | Stark | |
| 2012/0183771 A1* | 7/2012 | Fantini | D21H 19/52 427/256 |
| 2017/0008988 A1* | 1/2017 | Kusudou | C08F 8/12 |
| 2017/0190799 A1* | 7/2017 | Rissanen | C08B 3/20 |
| 2017/0260695 A1* | 9/2017 | Fantini | D21H 27/36 |

FOREIGN PATENT DOCUMENTS

| | | |
|---|---|---|
| EP | 3109263 A1 | 12/2016 |
| WO | 2011104427 A1 | 9/2011 |
| WO | 2015197906 A1 | 12/2015 |
| WO | 2016046379 A1 | 3/2016 |

OTHER PUBLICATIONS

International Search Report for the corresponding International Application No. PCT/FI2018/050723; International Filing Date: Oct. 9, 2018, dated Feb. 6, 2019; 6 pages.
Toncheva, V. D. et al., "Modified Poly(Vinyl Acetals)", Eur. Polym. J., vol. 28, No. 2, 1992; pp. 191-198.
Written Opinion for the corresponding International Application No. PCT/FI2018/050723; International Filing Date: Oct. 9, 2018, dated Feb. 6, 2019; 8 pages.

\* cited by examiner

*Primary Examiner* — Mark Halpern
(74) *Attorney, Agent, or Firm* — CANTOR COLBURN LLP (57) ABSTRACT

The invention relates to a method for manufacturing a paper substrate suitable for binding silicone in a catalytic hydrosilation reaction and products thereof, wherein the molecular weight of polyvinyl alcohol is used to control the viscosity of the water-based acetalization reaction, such that a paper substrate may be coated with acetalized polyvinyl alcohol that contains high amount of functional vinyl groups, wherein the functional vinyl groups are part of catenated carbon structures which contain at least 4 carbon atoms and which have an acetal connectivity with the backbone chain of the acetalized polyvinyl alcohol.

20 Claims, 4 Drawing Sheets

PAPER SUBSTRATE COMPRISING MODIFIED LOW MOLECULAR WEIGHT PVA WITH FUNCTIONAL VINYL GROUPS

This Application is a 371 of PCT/FI 2018/050723 filed 10 Sep. 2018

TECHNICAL FIELD

The invention relates to a paper substrate suitable for binding silicone in a catalytic hydrosilation reaction and to a method for manufacturing such paper substrate. The invention further relates to use of low molecular weight polyvinyl alcohol in a method for manufacturing a paper substrate.

BACKGROUND

Figure 1:
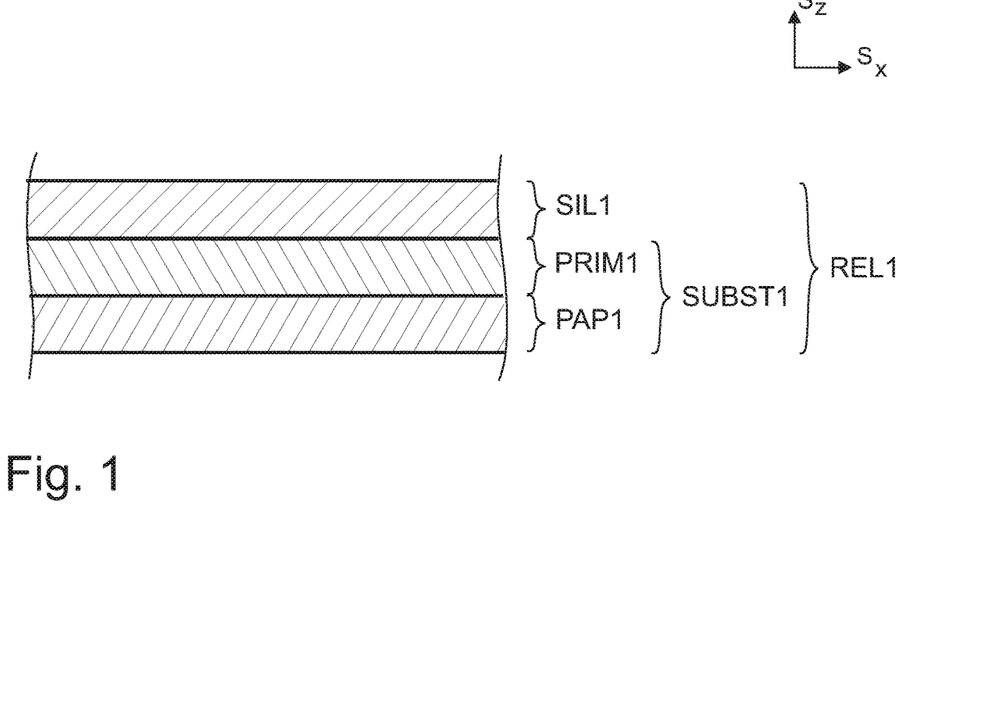
FIG. 1 illustrates, by way of an example, a cross-dimensional view of a release liner comprising a paper substrate and a release layer.

Release liner REL1, as disclosed herein with reference to FIG. 1, refers to a paper substrate SUBST1 which contains a release layer SIL1 (i.e. a cured release coating) applied on at least one side of the paper substrate SUBST1. Release liners comprising a cellulose fiber-based support layer PAP1 as part of the paper substrate SUBST1 are widely used as non-blocking backing material for self-adhesive products, such as self-adhesive labels. A typical cellulose fiber-based support layer suitable for use on a release liner is an industrial paper, which is manufactured from chemical pulp, such as bleached Kraft pulp. The purpose of a cellulose fiber-based support layer is to provide dimensionally stable and dense surface, on which a release coating may be applied. A typical example of an industrially manufactured paper that is used in a release liner is glassine paper.

The cellulose fiber-based support layer PAP1 may be coated with a film-forming primer layer PRIM1 to provide a barrier effect between the release layer REL1 and the cellulose fiber-based support layer PAP1. A conventional paper coating, also referred to as a "surface size", typically imbues surface closeness, thereby improving the tightness and smoothness of the coated surface of the cellulose fiber-based support layer PAP1.

Figure 2:
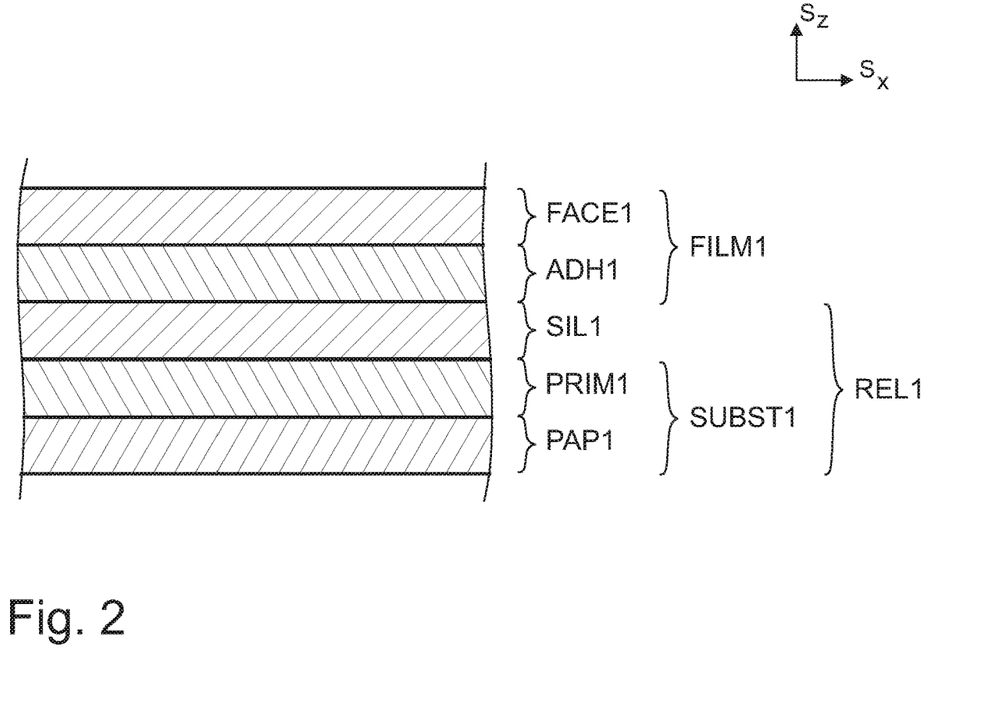
FIG. 2 illustrates, by way of an example, a cross-dimensional view of a label laminate web manufactured on a release liner.

With reference to FIG. 2, the paper substrate SUBST1 serves as a platform for a subsequent release coating, typically a silicone-based composition, which is applied on the paper substrate SUBST1 in oily form, which release coating is then cured to form the release layer SIL1. Products such as self-adhesive labels may thereafter be manufactured by coating the release layer SIL1 of the formed release liner REL1 with an adhesive, thereby forming an adhesive layer ADH1 and subsequently adjoining a face material FACE1, which serves as a printable surface, on the adhesive layer ADH1 surface, thereby forming a label laminate web FILM1.

Release coatings based on silicone compounds are typically easy to apply and well-flowing. Most common curing method of silicone coating is thermal curing, which is accomplished by a catalytic hydrosilation reaction between functional vinyl groups in the silicone base polymer and silane hydride (Si—H) groups in the cross-linker compound in the presence of a platinum catalyst, resulting into a solid release layer SIL1 attached to the surface of the paper substrate SUBST1. Among various thermal curing methods, low temperature curing, referred to as "LTC", is an advantageous method for saving energy. A low temperature curing in this context refers to a catalytic hydrosilation reaction taking place at a temperature of less than 120° C., preferably in the range of 55° C. to 110° C. Release coatings based on silicone compounds are expensive. The platinum catalyst used to accomplish the catalytic hydrosilation reaction is very expensive. Due to the high cost, there is a constant effort to reduce the amount of silicone compounds and platinum required for providing a release layer SIL1. Usually, in order to get a well-cured silicone network, the cross-linker compound is used in an excess stoichiometric amount to ensure complete curing of the base polymer. This excess amount poses a problem on reeled label laminate web FILM1 during storage, since due to the oily nature of the uncured cross-linker compound, at least some of the unreacted cross-linker compound can migrate through the paper substrate SUBST1. While the primer layer PRIM1 may provide some barrier effect, the unreacted cross-linker has despite a film-forming primer layer PRIM1 been observed to migrate through the primer layer and to the opposite side of the paper substrate SUBST1 underneath the primer layer PRIM1. Industrially manufactured paper substrates are never completely closed or impermeable and may contain some openings or pores, thereby allowing the uncured cross-linker compound to penetrate the paper substrate and reach the opposite side of the release liner REL1, thereby contaminating the adjacent surface of the label laminate web FILM1 on the reel. Upon contact with the label laminate web FILM1, the uncured cross-linker compound may smear portions of the face material FACE1 surface and subsequently cause problems with printing quality, such as poor print quality control or uneven intensity of the printed surface, especially when the face material FACE1 is a filmic face substrate, such as polyethylene, polypropylene, polyethylene terephthalate or a similar synthetic thermoplastic polymer, which are widely in use.

In addition to the migration phenomenon disclosed above, a further problem associated with the current release liners is the relatively low anchorage of the release layer SIL1 towards the paper substrate. In line with the labelling process developments, the speed of coating machines, which are used to apply the release coating, has increased significantly. It is desirable to optimize the reaction temperature and reduce reaction time during the addition curing reaction of a release coating containing a silicone polymer, in order to improve the cost-efficiency of the coating process. Novel fast-curing silicones can have a very branched molecular structure, much more so than those of the previous generations. The branched molecular structure leads to faster reaction kinetics. Novel, fast curing silicones therefore require less time for the addition curing reaction to take place.

A problem with respect to anchorage of the silicone compounds may arise, when the amount of platinum catalyst is reduced from the current level in the range of 50 to 35 ppm to a lower level, such as to a level of 30 ppm or below, even as low as 10 ppm. The reduced amount of platinum catalyst and silicone curing time, however, should not adversely affect the relative rub-off values of the release layer, which should remain consistent over time, since a release liner may be stored for a period of time prior to its use. This sets requirements for the paper substrate, which should promote long-term stable anchorage of the silicone to the paper substrate at low platinum levels, while enabling the use of fast curing silicone compounds, which are advantageous in reducing the high-speed release values. Good anchorage of the release layer SIL1 is especially important in high-speed labelling applications.

Figure 3:
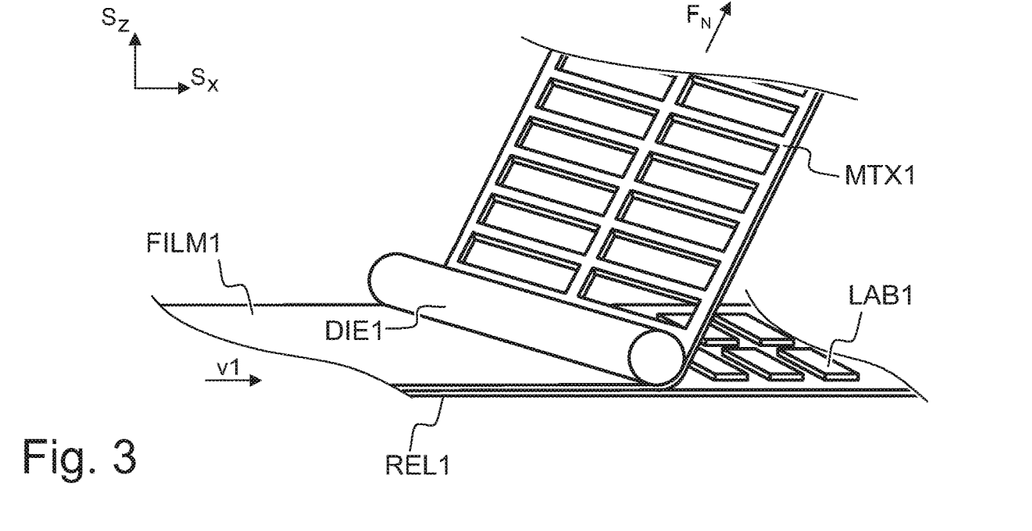
FIG. 3 illustrates, by way of an example, a method for manufacturing a label stock from a label laminate web, wherein a die cutting roll is used for providing labels and the excess matrix material is subsequently stripped away from the release liner, such that only the labels remain attached on the release liner.

With reference to FIG. 3, a label stock may be formed of a label laminate web FILM1 by cutting the label laminate web FILM1 with a die cutting roll DIE1 and stripping excess matrix material MTX1 away from the label laminate web FILM1, such that only the shaped labels LAB1 remain attached on the release liner REL1. A label stock as disclosed herein therefore refers to multiple labels LAB1 on a release liner REL1. When detaching a label LAB1 or excess matrix material MTX1 from the release liner REL1, the adhesive bonding of the adhesive layer ADH1 towards the release layer SIL1 resists the separation of the adhesive layer ADH1 from the release layer SIL1. The very high velocities used in today's labelling processes impose challenges to the release properties of the release liner, which have not existed in the past. It is therefore of importance, that the release layer SIL1 is firmly anchored to the paper substrate SUBST1, such that the release liner REL1 may serve as a reliable dehesive platform in high-speed applications. Release value is used to denote the minimum amount of force $F_N$ required to detach a label LAB1 or excess matrix material MTX1 from the release liner REL1. Modern high-speed labelling applications, which may operate at a very high velocity v1 up to tens of thousands of labels dispensed per hour, demand that the release liner has a sufficiently low and stable high-speed release value, such that the dispensing of labels from the release liner may proceed without interruptions. The higher the velocity in a labelling process is, the smaller is the acceptable amount of deficiency in the anchorage level of the release layer SIL1 towards the paper substrate SUBST1. This requirement is enhanced as the base weight (grammage) of the paper used in high-speed release liner applications is decreasing, both in the paper substrates and in the face material, which may also be of paper. The reduced base weight therefore leads also to lighter label laminate web FILM1 and subsequently weaker excess matrix material MTX1, which needs to be stripped away from the release liner REL1 with lower amount of force $F_N$ than before to avoid breaking the matrix material MTX1. The optimal anchorage level is also reflected in cost savings, as a lighter label laminate web FILM1 corresponds to thinner face material FACE1. Therefore, the amount of labels LAB1 produced from the same amount of face material FACE1 may be increased.

The aim to reduce the amount of silicone compounds and platinum required when providing a release layer SIL1, however, is not straightforward to solve. Reduction of the amount of silicone compounds can lead to formation of void areas, i.e. holes, in the release layer SIL1 which extend through the layer SIL1. When adhesive used in the adhesive layer ADH1 is applied on the release layer SIL1, the holes in the release layer SIL1 enable the adhesive to penetrate through the layer SIL1. In places where the adhesive penetrates deeper through the release layer SIL1 and into the primer layer PRIM1 beneath, also the minimum amount of force $F_N$ required to detach a label LAB1 or excess matrix material MTX1 from the release liner REL1 is increased. As the distribution and size of the holes in the release layer SIL1 is not even, also the minimum amount of force $F_N$ required to detach a label LAB1 or excess matrix material MTX1 from the release liner REL1 is not even but varies spatially. This spatial variation of the force $F_N$ is problematic for the dispensing of the labels LAB1 from the release liner REL1, especially in high-speed labelling applications.

The publication WO 2011/104427 suggests functionalizing a PVA polymer that contains hydroxyl functionalities in water-based reaction with undecylenic aldehyde. A disadvantage related to water-based reaction of polyvinyl alcohol is, however, that while water is a suitable solvent for certain grades of PVA polymer, for each grade of water-soluble PVA polymer, an increase in PVA concentration is accompanied by a rise in solution viscosity. A high degree of viscosity quickly impedes the reaction dynamics and eventually causes flocculation or micelle formation. Further to this, solvation of the PVA polymer to water is also slow and highly temperature-dependent, which limits the available reaction conditions. In addition, the organic molecule that has been used in the prior art is not water soluble, unlike the PVA polymer. Undecylenic aldehyde is commercially available, but the molecule is in an organic phase. As the density of undecylenic aldehyde is lower than the density of water, the reactant easily remains floating on the surface of an aqueous solution, in spite of stirring of the solution during the reaction. Therefore, the reaction of a mixture containing PVA polymer and undecylenic aldehyde is a two-phase reaction. To contact each other, the reactants need to reach over a phase interface, which reduces the reaction efficiency.

The prior art only discloses working examples, wherein undecylenic aldehyde as an organic molecule has been added to a reaction mixture in the range of 1.4 to 1.6 wt.-% (grams of undecylenic aldehyde per 100 grams of polyvinyl alcohol), which does not disclose the vinyl group molality in the formed compound. It has since been observed that at a higher PVA and/or undecylenic aldehyde concentration the reaction solution rapidly becomes highly viscose, despite vigorous stirring. At higher concentrations, when the ratio of undecylenic aldehyde to PVA is higher, the rapidly increasing viscosity therefore prevents efficient grafting of the organic molecule. Further, this prevents a subsequent application of the formed reaction product on a substrate surface as a coating composition. Therefore, industrial use of the reaction at higher dry matter content according to WO 2011/104427 is not feasible. Dry matter content in this context refers to the concentration of PVA in an aqueous solution. The prior art thus discloses a solution that has a maximum limit, which is set to a relatively low level. The amount of functional vinyl groups grafted on a modified PVA polymer disclosed in the prior art is not optimal for a release liner which is used in modern high-speed release liner applications as described above.

SUMMARY

The invention addresses the above disclosed problems by providing a method for manufacturing a paper substrate which contains acetalized polyvinyl alcohol having considerably higher amounts of functional vinyl groups than before. The higher amount of grafted functional vinyl groups may be accomplished by using low molecular weight polyvinyl alcohol to control the rheological behavior of the aqueous solution upon the grafting. This enables the suppression of the viscosity level, thereby allowing the reaction to proceed further. Thus, a coating composition comprising low molecular weight polyvinyl alcohol that has been grafted to contain catenated carbon structures with high vinyl group molality may be produced, which may still be applied on a cellulose fiber-based support layer by conventional paper coating methods. A cellulose fiber-based support layer coated with a primer layer containing catenated carbon structures with a high amount of functional vinyl groups provides an unprecedented means of improving the release characteristics of a subsequent release layer applicable on top of the primer layer, in particular when low temperature curable silicone compound is used.

Low molecular weight polyvinyl alcohol, hereafter denoted as LMW-PVA, in this context refers to polyvinyl alcohol having a weight average molecular weight, hereafter denoted as $\overline{M}_w$, of less than 50000 g/mol. The weight average molecular weight represents the mean average weight of the LMW-PVA, weighted according to weight fractions. Lower $\overline{M}_w$ of the polyvinyl alcohol enables larger amounts of organic molecules to be acetalized with the hydroxyl groups of the polyvinyl alcohol because it limits the increase in viscosity with increasing degree of modification. Advantageously, the $\overline{M}_w$ of the LMW-PVA is less than 40000 g/mol, most advantageously less than 20000 g/mol. For practical reasons, the LMW-PVA typically has $\overline{M}_w$ of at least 1000 g/mol, such as between 1000 and 50000 g/mol, preferably in the range of 1500 to 40000 g/mol, most preferably in the range of 2000 to 20000 g/mol, due to radical chain polymerization of the polyvinyl acetate, from which polyvinyl alcohol is subsequently hydrolyzed. Methanol may be used during the polymerization as a chain transfer agent together with peroxy- or azogroup containing initiators to adjust the molecular weight distribution of the formed polyvinyl acetate.

The low $\overline{M}_w$ of the polyvinyl alcohol has been observed to suppress the rise of viscosity of a solution during a water-based acetalization reaction. Viscosity in this context refers to the property of a fluid that resists a force tending to cause the fluid to flow. The flow behavior of LMW-PVA in water is therefore related to the viscosity of the solution during a water-based acetalization reaction. The flow behavior of LMW-PVA in water may be further controlled by selecting the degree of hydrolysis of the LMW-PVA grade. The viscosity η of the water-based solution containing the LMW-PVA may be configured low, such as less than 10000 mPa·s, during the water-based acetalization reaction.

For practical reason, the viscosity of the water-based solution containing the LMW-PVA should be less than 8000 mPa·s. Experimental results have demonstrated that industrial applicability of PVA modified with undecylenic aldehyde in an acetalization reaction is limited by the solution viscosity. In practice, in on-line coating processes suitable for paper mills, a coating composition having a viscosity higher than 8000 mPa·s does not have sufficient flow characteristics for pumping on a coating machine, the viscosity thereby limiting the use of PVA modified with undecylenic aldehyde in an acetalization reaction as a coating composition.

LMW-PVA thus has specific characteristics, which may be used to provide a composition containing a high amount of grafted vinyl groups. A paper substrate containing such composition in the primer layer is particularly suitable for binding low temperature curing silicone in a catalytic hydrosilation reaction, wherein high bonding strength between the release layer and the paper substrate is necessitated.

A water-based acetalization reaction of an organic molecule comprising both an aldehyde group and a functional vinyl group may therefore be performed at a higher efficiency. In particular, higher acetalization efficiency may be obtained with an organic molecule that has a terminal vinyl group and a catenated carbon structure containing at least 4 carbon atoms, preferably at least 5 carbon atoms. Preferably, the organic molecule is an aldehyde which contains a linear chain of 5 to 15 carbon atoms and which ends into a terminal vinyl group, such as 10-undecenal. The length of the catenated carbon structure, which preferably is a linear hydrocarbon chain, is advantageous for reducing the polarity of the formed acetalized polyvinyl alcohol. The high amount of catenated carbon structures, preferably hydrocarbon chains, may be used to provide a hydrophobic surface on the paper substrate. A hydrophobic surface, for example a primer layer containing acetalized polyvinyl alcohol, wherein catenated carbon structures have an acetal connectivity with the backbone chain of the acetalized polyvinyl alcohol, may be arranged to reduce the surface area exposed to water and decrease the entropy of the primer layer surface. A linear hydrocarbon is highly non-polar and therefore the polymer, i.e. the acetalized polyvinyl alcohol, when grafted to contain high amounts of such catenated carbon structures before coating onto a cellulose fiber-based support layer surface, has a tendency to avoid the hydrophilic surface of the cellulose fiber-based support layer beneath, which contains hydroxyl groups. The hydrophobic effect is dependent of the amount of the catenated carbon structures grafted onto the polymer structure. The non-polar catenated carbon structures that end into a terminal vinyl group may also acts as a surfactant. While a hydrophobic polymer coating, as such, has a poor adhesion to silicone, the catalytic hydrosilation reaction enables chemical bonding of the silicone. Acetalized polyvinyl alcohol containing a catenated carbon structure with high vinyl group content of equal to or above 0.2 mmol/g of the acetalized polyvinyl alcohol on the surface of the paper substrate has been observed to be advantageous in providing a hydrophobic effect to the paper substrate surface.

The term 'catenated carbon structures' is used to denote a series of bonded carbon atoms, wherein the carbon atoms are bonded to other carbon atoms. Carbon is known to be suitable for catenation, which herein refers to the formation of chain having interconnecting carbon-carbon bonds. Catenated carbon structures may also be referred to as 'catenae'. A catenated carbon structure in this context includes a hydrocarbon chain. A catenated carbon structure may also comprise substituents, such as oxygen, hydrogen or alkane or alkene groups, such as a vinyl group. The catenated carbon structure may have 4 or more interconnecting carbon atoms in a series. The catenated carbon structure may be branched. Preferably, the catenated carbon structure is a hydrocarbon chain having at least 7 carbon atoms, more preferably 11 carbon atoms, and which ends into a functional vinyl group.

On a primer layer, the catenated carbon structure may be a chain containing at least 5 carbon atoms, more preferably 11 carbon atoms, which chain from one end has an acetal connectivity with the acetalized polyvinyl alcohol and which chain at the other end terminates into a functional vinyl group. The catenated carbon structure is preferably configured to promote hydrophobicity, such that a primer layer containing sufficient amount of catenated carbon structures becomes more hydrophobic. For example, the acetalized polyvinyl alcohol may be configured to contain catenated carbon structures as side chains having acetal connectivity with the polymer backbone and which end into functional vinyl groups at the other end, such that the acetalized polyvinyl alcohol may contain functional vinyl groups in an amount of equal to or higher than 0.2 millimoles per gram of the acetalized polyvinyl alcohol.

The abbreviation mmol/g used hereafter denotes millimoles per gram of the acetalized polyvinyl alcohol, unless otherwise stated. The abbreviation therefore denotes the molality of vinyl groups in the acetalized polyvinyl alcohol, which has been formed in a water-based acetalization reaction of the dissolved polyvinyl alcohol and the reactant, which is an organic molecule that contains at least 4 carbon atoms and comprises both an aldehyde group and a functional vinyl group. The increased amount of non-polar catenated carbon structures reduces the effect of the hydroxyl groups present in the polyvinyl alcohol and on the cellulose fiber-based support layer surface. When the paper substrate has a more hydrophobic primer layer, the amount of a release coating containing silicone compound may be reduced. Less amount of release coating requires less platinum catalyst for curing to take place. Preferably, the primer layer contains catenated carbon structures with functional vinyl groups in an amount of equal to or higher than 0.2 mmol/g, more preferably equal to or higher than 0.3 mmol/g of the acetalized polyvinyl alcohol, since the molality of catenated carbon structures with functional vinyl groups on the paper substrate surface has been observed to correlate with high-speed release value. A higher molar amount of vinyl groups provides a lower and more stable release value, particularly in high-speed labelling applications. Most preferably, the primer layer contains catenated carbon structures with functional vinyl groups in an amount of equal to or higher than 0.5 mmol/g of the acetalized polyvinyl alcohol, as this further enables to reduce the thickness of the release layer.

A hydrophobic surface therefore facilitates the even spreading of the uncured silicone polymer applied on the surface. A hydrophobic primer layer may be used to resist the penetration of water-based or hot-melt adhesive material, which may be used in the manufacturing of a label laminate web FILM1 and may thus become into contact with the paper substrate SUBST1 surface. A hydrophobic polymer also evens out the characteristics, for example release characteristics, of the whole surface, despite the existence of possible defects, such as holes, which may sometimes be present in the cellulose fiber-based support layer PAP1.

When the release liner paper substrate contains acetalized polyvinyl alcohol comprising catenated carbon structures with functional vinyl groups in an amount of equal to or higher than 0.2 millimoles per gram of the acetalized polyvinyl alcohol, the release layer SIL1 is more firmly bonded to the paper substrate. A vinyl group molality of equal to or above 0.2 mmol/g is efficient in binding unreacted cross-linker component, when the cross-linker component is added in excess stoichiometric amount. A high vinyl group content of equal to or above 0.3 mmol/g of the acetalized polyvinyl alcohol on the surface of the paper substrate provides a paper substrate with improved intensity of the printed surface, when the paper substrate is used with a filmic face material, such as polyethylene, polypropylene, polyethylene terephthalate, polylactic acid or a similar film-forming thermoplastic polymer. The amount of functional vinyl groups may be measured by an iodometric titration method from the acetalized polyvinyl alcohol compound formed in the acetalization reaction.

According to an aspect of the invention, there is provided a paper substrate which is suitable for binding silicone in a catalytic hydrosilation reaction, the paper substrate comprising a cellulose fiber-based support layer and
a hydrophobic primer layer that contains acetalized polyvinyl alcohol, wherein the acetalized polyvinyl alcohol has an average molecular weight of less than 50000 g/mol, and
contains a vinyl group molality which is equal to or higher than 0.2 millimoles per gram of the acetalized polyvinyl alcohol, and wherein the functional vinyl groups are part of catenated carbon structures which contain at least 4 carbon atoms, and which have an acetal connectivity with the backbone chain of the acetalized polyvinyl alcohol.

The backbone chain is the longest series of covalently bonded atoms that together create the continuous chain of the molecule. In the case of acetalized polyvinyl alcohol, this refers to the polymer chain to which the catenated carbon structures have the acetal connectivity. Preferably, the catenated carbon structures are acyclic side chains. The acetalized polyvinyl alcohol on the primer layer may contain catenated carbon structures with functional vinyl groups in an amount of equal to or higher than 0.2 millimoles per gram, more preferably equal to or higher than 0.3 millimoles per gram, most preferably equal to or higher than 0.5 millimoles per gram of the acetalized polyvinyl alcohol. Preferably, the catenated carbon structures contain at least 5 carbon atoms, more preferably in the range of 5 to 15 carbon atoms.

The $\overline{M}_w$ of the acetalized polyvinyl alcohol is based on the $\overline{M}_w$ of the polyvinyl alcohol. Preferably, the $\overline{M}_w$ of both the acetalized polyvinyl alcohol and the polyvinyl alcohol referred to above is equal to or less than 40000 g/mol. Most preferably the $\overline{M}_w$ of the acetalized polyvinyl alcohol referred to above is equal to or less than 20000 g/mol. The reduction of the $\overline{M}_w$ of the polyvinyl alcohol enables to increase the amount of functional vinyl groups on the primer layer surface of the paper substrate. The $\overline{M}_w$ of both the acetalized polyvinyl alcohol and the polyvinyl alcohol referred to above may be, for example, between 1000 and 50000 g/mol, preferably in the range of 1500 to 40000 g/mol, most preferably in the range of 2000 to 20000 g/mol.

Lower viscosity of the water-based solution during a water-based acetalization reaction further enables increasing the dry matter content of the water-based solution. Therefore, the LMW-PVA may be dissolved to a less amount of water, which provides a reaction at a higher concentration and at a high conversion efficiency. A higher dry matter content in the formed reaction product is advantageous, since this enables coating of the reaction product on a cellulose fiber-based support layer as a primer layer at high concentration. A high dry matter content in the coating composition requires less drying. Preferably, the dry matter content of the polyvinyl alcohol in the water-based solution is equal to or higher than 25 wt.-%.

The effect of the molecular weight to the rheology of the solution has been observed in particular with respect to water-based and acid catalyzed acetalization reactions, wherein the LMW-PVA enables a higher amount of organic molecules having a catenated carbon structure with vinyl group to be grafted onto the polymer. Hence, when manufacturing the paper substrate, a coating composition containing high amount of catenated carbon structures and a high vinyl group molality may be applied on a cellulose fiber-based support layer surface, thereby forming a hydrophobic primer layer that contains acetalized polyvinyl alcohol having a very high vinyl group molality. A paper substrate containing high amount of functional vinyl groups is thus available on the paper substrate surface, which paper substrate may be used to improve the anchorage of a release coating containing fast curing silicone compound towards the paper substrate. The high density of catenated carbon structures with functional vinyl groups on the paper substrate surface provides more anchoring points which are suitable for cross-linking reactions with silane hydride groups present in fast-curing silicone compounds, that may be applied on the paper substrate. A paper substrate which comprises modified LMW-PVA containing catenated carbon structures with functional vinyl groups, may thereby improve the bonding strength between a paper substrate and a release layer.

The viscosity of polyvinyl alcohol has a significant effect on the flow behavior of the solution. When maintaining a relatively low degree of viscosity in the reaction mixture, the LMW-PVA may be arranged to react at a higher efficiency with an organic molecule comprising both an aldehyde and a vinyl function in a water-based acetalization reaction, such that a high conversion of the aldehyde to an acetal product is obtainable. This has not been possible in the past, since the high average molecular weight of polyvinyl alcohol has rapidly caused rise in viscosity of the reaction mixture, when the molar fraction of the reactants in the reaction mixture has been increased. In particular, when comparing an acetalization reaction of an organic molecule and LMW-PVA to an acetalization reaction of the organic molecule and higher molecular weight polymeric PVA, it has been observed that the LMW-PVA may be arranged to provide a higher modification degree, thereby resulting into a primer layer containing more functional vinyl groups per surface area unit of the paper substrate surface.

Advantageously, the degree of hydrolysis of the LMW-PVA is above 70%, preferably equal to or higher than 80%. The degree of hydrolysis of the LMW-PVA may be in the range of 70-99%, advantageously in the range of 85 to 99%. When the degree of hydrolysis of the LMW-PVA is below 70%, the solubility to water diminishes drastically. The affinity of the primer layer containing the acetal product towards the cellulose fiber-based support layer may further be increased by selecting the degree of hydrolysis of the LMW-PVA. The LMW-PVA may be arranged to be either fully hydrolyzed, referring to a degree of hydrolysis in the range of 97 to 100 mol-%. Alternatively, the LMW-PVA may be arranged to be partially hydrolyzed, referring to a degree of hydrolysis wherein the amount of hydroxyl groups is predominant, such that the whole compound is water-soluble. A partially hydrolyzed LMW-PVA may have a degree of hydrolysis of less than 97 mol-%. The degree of hydrolysis has an effect on the amount of acetyl groups in the compound. Fully hydrolyzed LMW-PVA has a high crystallization tendency and a reduced cold-solubility in water. This effect is reduced in partially hydrolyzed LMW-PVA, which contains more acetyl groups. However, the hydrophobicity increases, when the solubility to water diminishes.

For example, the degree of hydrolysis in the LMW-PVA may be selected such that a water-based reaction of LMW-PVA with 10-undecenal yields an acetalized reaction product comprising a catenated carbon structure with a very high amount of functional vinyl groups. The lower viscosity of the solution during a water-based acetalization reaction further enables higher dry matter content of the LMW-PVA to be used. At a higher concentration of 10-undecenal in a solution having relatively low viscosity, the acetalization reaction may proceed further and yield polyvinyl alcohol comprising 10-undecylenic groups which have been acetalized into the structure, and wherein the acetalized polyvinyl alcohol thus contains vinyl group molality of equal to or more than 0.20 mmol/g, preferably equal to or more than 0.23 mmol/g, such as equal to or more than 0.3 mmol/g, such as in the range of 0.2 to 1.4 mmol/g of the acetalized polyvinyl alcohol.

By maintaining the viscosity of the water-based fraction in the reaction at a lower level, the grafting reaction with the organic molecule may be arranged to proceed further, thereby obtaining a higher amount of catenated carbon structures with functional vinyl groups into the formed reaction product. The lower viscosity of the reaction mixture further facilitates the mixing of the reactants, thereby allowing the reactants to be better in contact with each other, despite possible phase layer interfaces. This is the case in particular, when a non-water-soluble organic molecule, such as 10-undecenal, is used. The amount of stirring correlates with the amount of surface area available for chemical reactions; the better the mixing of the reactants reagents during the reaction is, the higher is the probability of the participating functional groups to be in contact for a reaction to take place. Hence, a paper substrate having a higher density of catenated carbon structures with acetal connectivity to the polymeric vinyl alcohol and functional vinyl groups per unit area of the primer layer surface may be obtained. Of notice is that an increase in the thickness of the primer layer does not have an effect to the amount of functional vinyl groups at the primer layer surface. While a thicker primer layer may comprise more vinyl groups, the majority of the vinyl groups in the thicker primer layer would still remain inside the primer layer and would not be exposed to the primer layer surface. Therefore, the most relevant means to increase the amount of functional vinyl group at the primer layer surface is a polymer containing more functional vinyl groups per unit area, such that they are able to participate in a catalytic hydrosilation reaction with a release coating based on silicone compounds.

By maintaining the viscosity of the water-based fraction in the reaction at a lower level, the grafting reaction with the organic molecule may further be arranged to proceed towards a more complete reaction conversion, such that more of the acetalized reaction product may be obtained from the amount non-acetalized starting materials. The higher conversion of reactants to a reaction product has a further effect of reducing the amount of unreacted reactant present in the reaction mixture after the reaction has taken place. Therefore, there is less need for purification of the reaction mixture of unreacted reactant which could be recycled, for example. A particular advantage of low molecular weight polyvinyl alcohol is, that the formed reaction product, when comprising catenated carbon structures with high amounts of functional vinyl groups, is easier to purify. The method thereby provides a clear advantage over the prior art by facilitating purification, increasing the process safety and the recyclability of the process chemicals.

Upon significantly increasing the amount of catenated carbon structures with functional vinyl groups on the primer layer of the paper substrate that are covalently attached to a polyvinyl alcohol, the formed release liner may be arranged to have lower and stable high-speed release values, such that the release liner may function without problems in various high-speed end applications. Moreover, a polyvinyl alcohol grafted to contain catenated carbon structures and containing a higher vinyl group molality can be better diluted with unmodified PVA while maintaining good silicone adhesion. In particular, when the primer layer contains a polymer comprising catenated carbon structures with vinyl functional groups in a sufficient amount, the silane-hydride groups of the cross-linker compound may be also reacted with the vinyl functional groups present in the primer layer, such that the resulting release layer has a cross-linked structure in three orthogonal directions. The release layer may be thus be crosslinked within directions $S_x$, $S_y$ parallel and also in a direction perpendicular $S_z$ to the plane of the release layer, thereby providing a strong attachment of the release layer to the paper substrate. In other words, the combination of a primer layer containing acetalized polyvinyl alcohol having a sufficiently high vinyl group molality, such as equal to or higher than 0.2 millimoles per gram, preferably equal to or higher than 0.3 millimoles per gram, most preferably equal to or higher than 0.47 millimoles per gram of the acetalized polyvinyl alcohol, and a fast-curing silicone compound comprising more than the stoichiometric amount of the cross-linker component containing silane-hydride bonds, may be used to improve the covalent attachment of the fast-curing silicone compound to the primer layer.

In addition, the migration characteristics of any unreacted cross-linker compound containing functional groups with silane-hydride (Si—H) bonds after the curing reaction are also related to the amount of the vinyl groups available for polyaddition reaction on the surface of the paper substrate, prior to forming the release liner. A high vinyl group content of equal to or above 0.2 mmol/g, preferably equal to or above 0.3 mmol/g, most preferably equal to or above 0.5 mmol/g of the acetalized polyvinyl alcohol on the surface of the paper substrate is advantageous for binding the unreacted cross-linker compound into the release layer, as well.

Advantageously, as disclosed above, the primer layer therefore contains acetalized polyvinyl alcohol having a vinyl group molality vinyl equal to or higher than 0.2 millimoles per gram (mmol/g), preferably equal to or higher than 0.2 mmol/g, most preferably equal to or higher than 0.5 mmol/g of the acetalized polyvinyl alcohol. The vinyl group molality $b_{vin}$ of the acetalized polyvinyl alcohol may be, for example, in the range of 0.20 to 1.41, preferably in the range of 0.23 to 1.21, most preferably in the range of 0.28 to 1.01 millimoles per gram of the acetalized polyvinyl alcohol. A higher vinyl group content has been observed to correlate with a lower high-speed release value. A higher vinyl group content has further been observed to correlate with even printing intensity.

According to another aspect of the invention, there is thus provided a method for manufacturing a paper substrate which is suitable for binding silicone in a catalytic hydrosilation reaction, the method comprising steps of
  dissolving polyvinyl alcohol which has an average molecular weight of less than 50000 g/mol and degree of hydrolysis in the range of 70% to 99% into water into water, thereby obtaining a water-based solution containing dissolved polyvinyl alcohol,
  adding reactant which is an organic molecule that contains a catenated carbon structure having at least 4 carbon atoms, an aldehyde group and a functional vinyl group into the water-based solution containing the dissolved polyvinyl alcohol,
  reacting the reactant with the dissolved polyvinyl alcohol in a water-based acetalization reaction, thereby forming acetalized polyvinyl alcohol which contains functional vinyl groups, wherein the functional vinyl groups are part of catenated carbon structures which contain at least 4 carbon atoms, and which have an acetal connectivity with the backbone chain of the acetalized polyvinyl alcohol, and
  coating a cellulose fiber-based support layer with the acetalized polyvinyl alcohol, thereby forming a hydrophobic primer layer and the paper substrate, wherein the vinyl group molality of the acetalized polyvinyl alcohol is equal to or higher than 0.2 millimoles per gram of the acetalized polyvinyl alcohol.

The method may further comprise removing unreacted reactant from the reaction solution containing acetalized polyvinyl alcohol, for example by means of temperature-dependent purification of the formed reaction product from the reactant. The method may thus further comprise recycling of the reactant.

The invention is further described in the independent and dependent claims.

BRIEF DESCRIPTION OF THE DRAWINGS

FIGS. 1 to 5 are schematic.

$S_x$ and $S_z$ represent orthogonal directions in the figures.

DETAILED DESCRIPTION

Release Liner

Figure 4:
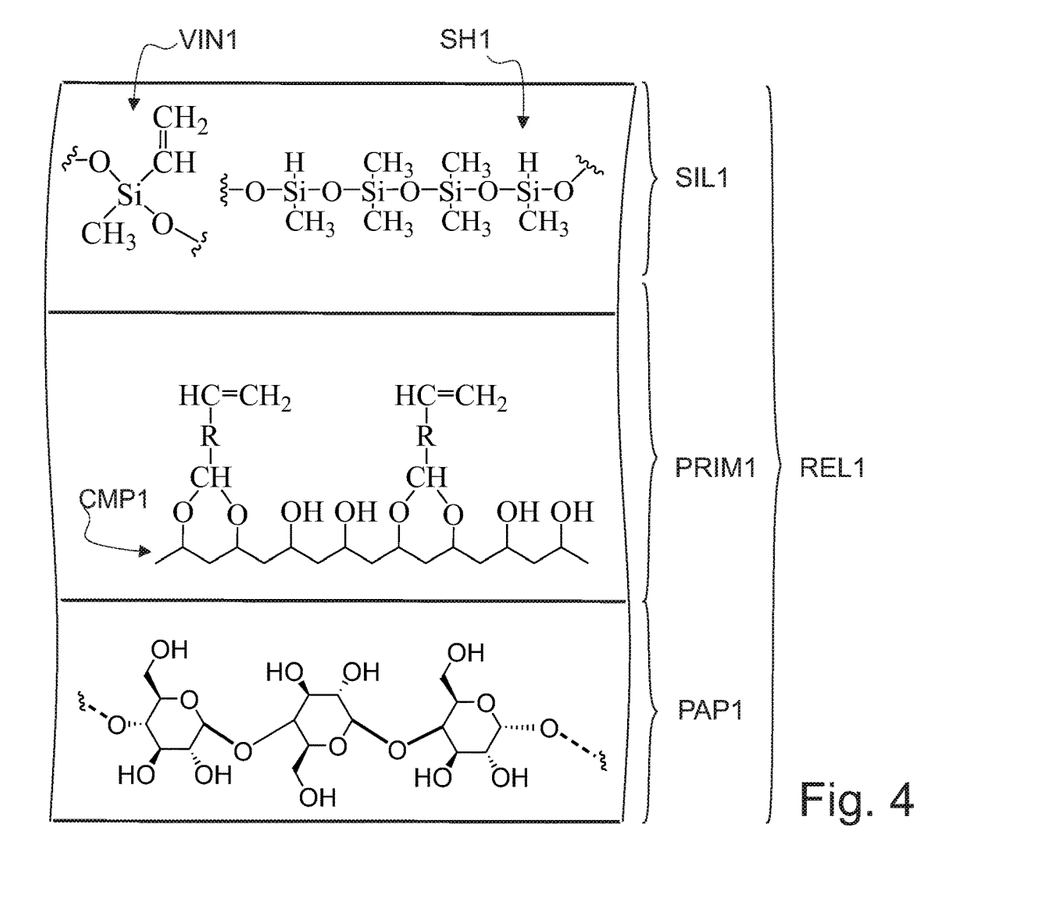
FIG. 4 illustrates, by way of an example, a cross-dimensional view of a release coating containing low temperature curable silicone compound applied on top of a paper substrate comprising a cellulose fiber-based support layer and a primer layer containing acetalized low molecular weight polyvinyl alcohol that contains functional vinyl groups, wherein the functional vinyl groups are part of catenated carbon structures which contain at least 4 carbon atoms and which have an acetal connectivity with the backbone chain of the acetalized polyvinyl alcohol.

Reference is made to FIGS. 3 and 4. A release liner REL1 refers to a thin multilayer structure having width, length and thickness dimensions. A release liner REL1 having a multilayer structure comprises at least a paper substrate SUBST1 and a release layer SIL1, such as a silicone-based release layer, applied on at least one side of the paper substrate SUBST1. A paper substrate SUBST1 is used herein to denote a coated cellulose fiber-based support layer PAP1, wherein the cellulose fiber-based support layer PAP1 has been coated from at least one side with at least one primer layer PRIM1 such that the coated side of the paper substrate SUBST1 is suitable for binding silicone in a catalytic hydrosilation reaction. A catalytic hydrosilation reaction herein denotes an addition curing reaction.

Primer Layer

Reference is made to FIGS. 2, 3, 4 and 5. A primer layer PRIM1 in this context refers to a polymer containing layer coated on a cellulose fiber-based support layer PAP1. A cellulose fiber-based support layer PAP1 may contain one or more primer layers PRIM1. A primer layer PRIM1 is typically configured to reduce the porosity of the paper surface, thereby improving the smoothness of the paper surface.

Polyvinyl alcohol, starch, and/or carboxymethyl cellulose are polymers having a film-forming nature which are widely used to provide barrier properties between the release layer SIL1 and the cellulose fiber-based support layer PAP1 surface. The primer layer PRIM1 is applied as a coating composition on the cellulose fiber-based support layer PAP1 surface, when manufacturing the paper substrate SUBST1.

When the primer layer PRIM1 contains an acetalized polyvinyl alcohol CMP1, the primer layer PRIM1 may be used for improving the bonding strength between the paper substrate SUBST1 and the release layer SIL1 and/or optimizing the release value of the release layer SIL1. The primer layer PRIM1 may thus further consist of or contain acetalized polyvinyl alcohol CMP1 that has been formed in a water-based acetalization reaction with low molecular weight polyvinyl alcohol, i.e. LMW-PVA, and an organic molecule comprising both an aldehyde group and a functional vinyl group, such that the formed acetalized polyvinyl alcohol CMP1 contains functional vinyl groups. When the LMW-PVA has a low $\overline{M}_w$, such as less than 50000 g/mol, the formed acetalized polyvinyl alcohol CMP1 inherits this characteristic, as the molecular weight of the grafted organic molecule in general is very small in comparison to the $\overline{M}_w$ of LMW-PVA.

Cellulose Fiber-Based Support Layer

The cellulose fiber-based support layer PAP1 refers to a paper containing cellulose fibers, which paper is suitable for use as a layer of a release liner.

When manufacturing paper suitable for a release liner, the pulp is typically derived from a chemical pulping process. Chemical pulping disintegrates the structure of the wood with strong chemicals in a cooking process, thereby producing fibrous material with a very high cellulose fiber content of equal to or higher than 70 wt. %, preferably equal to or higher than 80 wt. %, most preferably equal to or higher than 90 wt. %. A chemical pulping process removes nearly all of the lignin and at least part of the hemicelluloses, while preserving well the fiber structure and length. Examples of chemical pulping processes are, for example, the sulphite pulping process or the Kraft pulping process. The Kraft pulping process uses sodium sulphide and alkali to degrade and dissolve the lignin. The remaining lignin in the chemical pulp, while only in residual amounts of less than 5 wt. %, may still cause darkening of the pulp. The remaining lignin can be further removed through bleaching processes, thereby providing bleached chemical pulp. The first bleaching steps are further delignification stages, whereas the later steps are brightening stages, in which the brown-color inducing chromophores are removed, thereby increasing the pulp whiteness and brightness. Bleached chemical pulp typically contains lignin in an amount of less than 2 wt. %, preferably less than 1 wt. %, most preferably less than 0.5 wt. % of the bleached chemical pulp. Bleaching is typically used to improve the brightness and whiteness of the pulp. In papers used for release liners, a high transparency level of the paper is desirable. The Kraft process, in particular, decreases considerably the amounts of hemicelluloses, lignin, wood extractives and inorganics in the pulp material such that only residual traces of these compounds remain; thereby bleached Kraft pulp may be denoted as essentially 'lignin free'.

In this context, a paper suitable for use as a layer of a release liner refers to paper manufactured on a paper machine. In release liner manufacturing, paper substrate quality and suitability for coating with a silicone compound may be determined based on the smoothness, density, porosity and transparency of the paper substrate. Typical characteristics of a paper suitable for use as a layer of a release liner are smoothness of at least 900 sec/min (ISO 5627), density of at least 1.0, such as in the range of 1.0 to 1.2, wherein the density refers to grammage (ISO536) per thickness (ISO534), porosity equal to or less than 15000 pm/Pas (ISO11004) and transparency of equal to or higher than 40%, preferably equal to or higher than 44% when the paper grammage is less than 70 g/m$^2$, or equal to or higher than 28%, preferably equal to or higher than 33% when the paper grammage is equal to or higher than 70 g/m$^2$ (ISO2470), the parameter values corresponding to ISO standards referred in parentheses.

In practice, paper types lending themselves for release liner applications are vegetable parchment, greaseproof paper, coated papers and glassine. Of these, glassine is preferred for industrial manufacturing of high-quality release liner, due to the mechanical properties of the paper obtained in the manufacturing process.

Conventionally, the paper may have been made essentially of bleached chemical pulp, such as bleached Kraft pulp. While hardwood is advantageous for increasing the brightness of the paper, softwood having a longer average fiber length is typically used together with the hardwood in bleached Kraft pulp to improve the internal bond strength and facilitate the formation of the paper web. The combination of bleached chemical pulp comprising hardwood and softwood may also be used to improve the burst strength and tensile strength of the paper.

Glassine is paper typically made of bleached chemical pulp, having a grammage in the range of 30 to 160 g/m$^2$. When producing glassine paper, the pulp is refined to obtain a fiber fineness, which enables a dense, nearly unporous, paper surface to be obtained. Such a surface is resistant to air and liquids such as oil and water. When manufacturing glassine paper, the pulp slurry is first refined to a high level, the formed paper web is then pressed and dried, and a coating layer containing conventional sizing polymers having a film-forming nature such as unmodified polyvinyl alcohol, starch, and/or carboxymethyl cellulose is applied on the cellulose fiber-based paper surface to provide barrier properties. Glassine is calendered with a multi-nip calender or a supercalender before or after applying the coating layer, to obtain a product having high density surface, high impact strength, high tear resistance and transparency. The coating layer may be applied as a separate layer or together with polyvinyl alcohol that contains functional vinyl groups.

Release Layer

Reference is made to FIGS. 2 and 4. The release layer SIL1 is formed of a release coating applied on the paper substrate SUBST1 surface. The release coating is typically applied as an uncured composition, which is a liquid polymer resin that is subsequently cured to form the release layer SIL1. A cured release layer SIL1 has a non-blocking surface. The surface energy level of a cured release layer SIL1 is typically in the range of 21 to 25 dynes/cm. The non-blocking surface of the cured release layer SIL1 may be used to protect the adhesive layer ADH1 material of a label laminate web FILM1 from premature adhesive bonding.

When the release coating is temperature curable silicone the cross-linker compound SH1 with silane hydride groups and the silicone polymer VIN1 with functional vinyl groups are configured to cross-link in a catalytic hydrosilation reaction at a low temperature.

Organic Molecule

Figure 5:
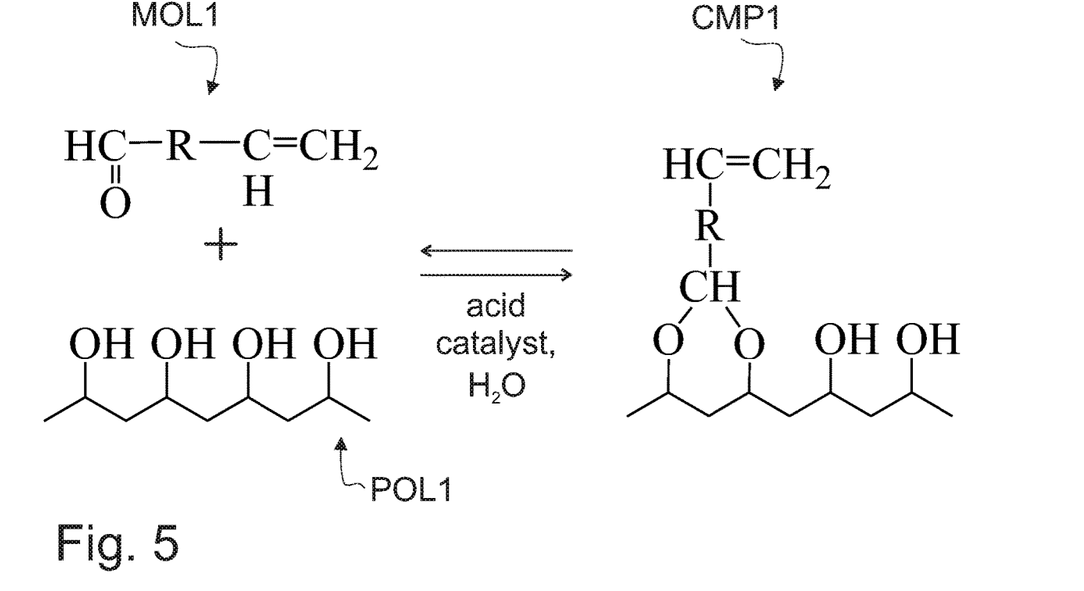
FIG. 5 illustrates, by way of an example, a schematic reaction, wherein organic molecule comprising both an aldehyde group and a functional vinyl group is reacted in a water-based acetalization reaction with LMW-PVA, such that an acetalized LMW-PVA is formed, wherein the acetalized LMW-PVA contains functional vinyl groups grafted onto the polymeric structure.

Reference is made to FIGS. 4 and 5. An organic molecule MOL1 in this context refers to a reactant. An organic molecule has a chemical structure which is defined by number or carbon atoms and functional groups. An organic molecule suitable for a grafting LMW-PVA in this context further refers to a small molecule comprising a catenated carbon structure that terminates into an aldehyde at the first end of the chain and into a functional vinyl group at the other end of the chain. The organic molecule MOL1 should have a catenated carbon structure having a carbon chain length of at least 4 carbon atoms. The symbol R in FIG. 5 is used to denote the part of the organic molecule which separates the functional vinyl group and the aldehyde group of the organic molecule MOL1 from each other such that the catenated carbon structure of the organic molecule MOL1 contains at least four carbon atoms. A catenated carbon structure having a chain length of less than 4 carbon atoms in the organic molecule MOL1 hydrocarbon chain may lead to interference with the LMW-PVA during the grafting reaction. A catenated carbon structure having a chain length of equal to or less than 15 carbon atoms is preferred, as a longer chain length may lead to chain folding problems. Therefore, a suitable organic molecule MOL1 for a paper substrate SUBST1 has a catenated carbon structure, preferably a hydrocarbon chain containing at least 4 carbon atoms, preferably in the range of 5 to 15. Preferably, the catenated carbon structure is aliphatic. More preferably, the catenated carbon structure is acyclic. When the catenated carbon structure is linear or branched, steric hindrances are better avoided. When the catenated carbon structure is a hydrocarbon, the non-polar effect of the carbon chain is very high. A catenated carbon structure, however, may also comprise substituents, such as oxygen, hydrogen or functional alkane or alkene groups, such as vinyl group. The organic molecule MOL1 is most preferably a terminally unsaturated aldehyde having a general formula $CH_2=CH-(CH_2)_n-CH=O$, wherein n=1 to 12. Examples of preferred organic molecules are those having a chain length comprising 5 to 12 carbon atoms, such as 10-undecenal having a formula $CH_2=CH(CH_2)_8-CH=O$, 4-pentenal having a formula $CH_2=CH-(CH_2)_2-CH=O$, and 2,2-dimethyl-4-pentenal having a formula $CH_2=CH-CH_2C(CH_3)_2-CH=O$. Preferably, the organic molecule MOL1 is 10-undecenal or 2,2'-dimethyl-4-pentenal, such that the acetalized compound comprises a hydrocarbon chain that contains 11 or 5 carbon atoms in a row, respectively. Of these, the preferred is 10-undecenal, which is a commercial fine chemical available in industrial amounts.

When the organic molecule MOL1 is reacted in a water-based acetalization reaction, the selection of the organic molecule MOL1 further depends of the desired substitution degree of the low molecular weight polyvinyl alcohol POL1 upon the grafting reaction. A terminally unsaturated aldehyde having a shorter hydrocarbon chain has a better water-solubility and may therefore be used to provide a higher efficiency in the grafting reaction. The higher water solubility allows the reagent to be better in contact with the low molecular weight polyvinyl alcohol POL1. A shorter hydrocarbon chain length of the organic molecule MOL1 therefore may increase the probability of the participating functional aldehyde groups to be in contact with hydroxyl groups of the low molecular weight polyvinyl alcohol POL1, such that a water-based acetalization reaction may take place at a high efficiency. The low molecular weight polyvinyl alcohol further improves the coatability of the acetalized polyvinyl alcohol.

When each organic molecule contains a single vinyl group, the mass ratio of the reactant to the polyvinyl alcohol corresponds to the vinyl group molality $b_{vin}$ of the formed compound according to equations 1a and 1b below:

$$\text{mass ratio} = R_m = \frac{\text{mass of organic molecule}}{\text{mass of polyvinyl alcohol}} \quad \text{Equation 1a}$$

$$\text{vinyl group molality} = b_{vin} = \frac{1000 \frac{\text{mmol}}{\text{mol}} \times \frac{R_m}{M_{ald}}}{1 + R_m \times \frac{M_{ald} - M_{H2O}}{M_{ald}}} \quad \text{Equation 1b}$$

In the equations 1a and 1b (above), the mass ratio $R_m$ refers to the amount of the aldehyde reactant in grams that has been reacted per 100 grams of the polyvinyl alcohol. The mass ratio $R_m$ may also be expressed as degree of modification and the units given in percent by weight (wt.-%) of the polyvinyl alcohol. When an aldehyde group reacts with two hydroxyl groups of the polyvinyl alcohol in an acetalization reaction, a water molecule is eliminated from the acetalized polyvinyl alcohol that is formed. Water molecule has a molecular weight $M_{H2O}$ of 18 g/mol. The molecular weight of the organic molecule containing the aldehyde group is referred to as $M_{ald}$.

In practice, for example, when the mass ratio $R_m$ of 10-undecenal having molecular weight of 168 g/mol to polyvinyl alcohol is 0.035, which is equal to 3.5 wt.-% modification degree, the vinyl group molality $b_{vin}$ in the acetalized polyvinyl alcohol is calculated as follows:

$$\text{vinyl group molality} = b_{vin} = \frac{1000 \times \frac{0.035}{168}}{1 + 0.035 \times \frac{168 - 18}{168}} = 0.20 \text{ mmol/g}$$

Table 1 (below) show correlation between degree of modification and coatability of the composition in a paper coating process. The experimental study was comparative and used polyvinyl alcohol having an average molecular weight higher than 50000 g/mol. The results demonstrate a rapid rise in viscosity of the modified polymer, when the amount of 10-undecenal increases. In contrast, with a compound based on low molecular weight polyvinyl alcohol, the coatability is preserved to a higher degree of modification, up to a vinyl group content of 1.41 mmol/g, when 10-undecenal is used as the organic molecule in the acetalization reaction.

Table 1. Comparison of vinyl group contents (molality) in modified polyvinyl alcohol samples as a function of the aldehyde reactant content (10-undecenal, molecular weight of 168 g/mol). The 'degree of modification (wt.-%)' refers to the mass ratio (in percentages) of the aldehyde reactant in grams that has been reacted per 100 grams of the polyvinyl alcohol. The 'coatability' refers to the coatability of the reaction product to a cellulose fiber-based support layer, wherein the formed polymer product is either easy to coat ('1') such that reaction product viscosity is low enough to apply by conventional coating means, or the polymer is difficult to coat ('2') such that that reaction product forms a viscose gel which is not easy to apply by conventional coating means, or the polymer has lost its coatability ('3') to such a degree that the reaction product could no longer be applied as a coating.

| degree of modification (wt.-%)* | vinyl group content ** (mmol/g) | coatability |
|---|---|---|
| 0 | 0 | 1 |
| 1 | 0.06 | 1 |

-continued

| degree of modification (wt.-%)* | vinyl group content ** (mmol/g) | coatability |
|---|---|---|
| 2 | 0.12 | 2 |
| 3 | 0.17 | 3 |
| 3.5 | 0.20 | 3 |
| 4 | 0.23 | 3 |
| 5 | 0.28 | 3 |
| 10 | 0.55 | 3 |
| 15 | 0.79 | 3 |
| 20 | 1.01 | 3 |
| 25 | 1.21 | 3 |
| 30 | 1.41 | 3 |

*calculated according to Equation 1a.
** calculated according to Equation 1b.

Low Molecular Weight PVA

Polyvinyl alcohol is commercially manufactured from polyvinyl acetate via hydrolysis. The main structure and degree of polymerization of polyvinyl alcohol is established already when the vinyl acetate monomers are polymerized. Polymerization in this context refers to the rapid chain extension reaction connecting the used individual monomer units together into a compound having a high $\overline{M}_w$, which consists of a large number of monomer units covalently bound together in the polymerization reaction. A polymer hence refers to a product directly obtainable by a polymerization reaction. In polymer science, the backbone chain of a polymer is the longest series of covalently bonded atoms that together create the continuous chain of the molecule.

LMW-PVA may be obtained by controlled polymerization and subsequent hydrolysis of polyvinyl acetate, as explained above. LMW-PVA is particularly useful as a reagent in grafting reaction of an aqueous solution, wherein low viscosity degree is needed.

The LMW-PVA compounds that are believed to be useful in the practice of this invention have flow and viscosity characteristics which permit use of the formed acetalized polyvinyl alcohol as part of a coating composition applicable on a cellulose fiber-based support layer. Advantageously, the LMW-PVA has an $\overline{M}_w$ of less than 50000 g/mol.

Acetalization Reaction

Reference is made to FIG. 5, which illustrates, by way of an example, a water-based acetalization reaction of an organic molecule MOL1 comprising both an aldehyde group and a functional vinyl group with low molecular weight polyvinyl alcohol POL1, such that acetalized polyvinyl alcohol CMP1 based on the low molecular weight polyvinyl alcohol POL1 is formed, wherein the acetalized polyvinyl alcohol CMP1 contains functional vinyl groups grafted onto the polymeric structure. Acetalization reaction as disclosed herein refers to a reversible chemical reaction comprising an acid catalyst, such as sulphuric acid, that is used to provide acidic condition to a water-based medium, thereby initiating a reaction wherein two hydroxyl groups of the LMW-PVA POL1 are reacted with the aldehyde group of the organic molecule MOL1 which in acidic conditions leads to the formation of an acetal.

When providing acidic conditions (pH in the range of 1.5 to 2.5) and a reaction mixture containing relatively low amount of organic molecules compared to a relatively high amount of water, the balance of the acetalization reaction is on the acetal side, the reaction thereby providing acetalized low molecular weight polyvinyl alcohol CMP1 wherein two hydroxyl groups of the LMW-PVA have been covalently bonded to the carbonyl group of the aldehyde. The water-based acetalization reaction may be performed in 1 hour or less, such as in the range of 20 to 60 minutes. The reaction temperature may be above room temperature, such as in the range of 20 to 99° C. Preferably the reaction temperature is above 50° C., as a higher reaction temperature correlates with accelerated reaction kinetics. The acetalization reaction may be terminated by adjusting the solution pH to 7, for example by addition of a suitable neutralizing agent, such as sodium hydroxide. The neutralization step which terminates the acetalization reaction is preferably followed by a purification with acetone precipitation. Purification removes unreacted reactant and any by-products, such as inorganic salts, formed due to the neutralization step from the acetalized reaction solution.

Coating of the cellulose fiber-based support layer with unpurified acetalized reaction solution may result in further, undesired reactions on the surface of the cellulose fiber-based support layer. This may cause problems in novel high-speed release liner applications, wherein higher bonding strength and lower release values are needed between the paper substrate and the release layer.

Acetalization Reaction Efficiency

When 10-undecenal is used in a water-based acetalization reaction, the reaction is not complete, and the unreacted reactant is readily detectable by its distinct odor. The efficiency of the acetalization reaction with respect to the organic molecule may be further evaluated by means of an analytical method, for example by means of gas chromatography from the acetalized reaction solution.

Analytical method to evaluate the efficiency of the acetalization reaction from a reaction solution or from a paper substrate surface may comprise providing a sample of unreacted solution containing LMW-PVA and an amount of organic molecule providing a sample of the same solution after an acetalization reaction, the solution thereby comprising acetalized polyvinyl alcohol in addition to any unreacted organic molecule, drying both samples at a temperature of 40° C., and sealing each dried sample hermetically into a container, such as a glass bottle, heating the hermetically sealed samples in the containers in a temperature of 200° C. for 1 hour, and after heating, analyzing the evaporated compounds from each heated sample by means of gas chromatography, thereby allowing detection of any evaporated material in gaseous form from the samples. By comparing the resulting peaks to each other and to a known reference peak, the amount of evaporated starting material may be determined. The method therefore may be used to determine the amount of unreacted reactant in a solution. The amount of reacted reactant may be further determined by modifying the analytical method above such, that the solution after an acetalization reaction is first purified by acetone precipitation and the purified product is then hydrolyzed in an acidic aqueous solution such that the reactant regains the aldehyde form. By measuring the amount of the reactant in the aldehyde form from the acidic aqueous solution, the efficiency of the acetalization reaction may be verified from the purified acetalized polyvinyl alcohol.

The analytical method may be performed, for example, with HeadSpace-GC-MDS equipment, wherein e.g. unreacted 10-undecenal may be detected by its specific retention time, i.e. the time needed for this specific component to flow through the separation column of the gas chromatography device. Analytical comparison of an unreacted solution and reacted solution may thus be used to provide a comparison, wherein the amount of unreacted 10-undecenal in the acetalization reaction is calculated from the integrated surface areas of the peaks of a solution before and after an acetalization reaction.

Alternatively, or in addition, proton nuclear magnetic resonance ($^1$H-NMR) analysis may be used to identify the presence of functional groups from the chemical shift value δ of the reactants and from the obtained reaction products. Samples for the $^1$H-NMR analysis may be prepared, for example, by dissolving 1 to 10 mg of the reactant or the formed reaction product in 1 ml of DMSO-d6 solvent and measuring standard $^1$H spectrum with 16 scans for each of the prepared NMR samples with a suitable analysis device, e.g. Bruker AVANCE-series spectrometer (400 Hz). Signals typical for a vinyl group may be detected in the region between δ=4.8 to 6.0 ppm, approximately. For instance, the quantification of 10-undecenal can preferably be done by using the peak at δ=5.7 to 5.9 ppm. The methine proton adjacent to the hydroxyl group (CH$_2$—C$\underline{H}$(OH)—CH$_2$) on the backbone of LMW-PVA is located at δ=3.8 to 3.9 ppm and can be used as a point of reference. Molar fraction of vinyl groups per vinyl alcohol unit can be determined using the $^1$H-NMR spectrum by calculating the relative peak areas for one proton from both vinyl group and PVA backbone. In addition, when collecting and analyzing NMR samples prepared from solutions before and after an acetalization reaction, the NMR results may further be used to determine how much of the aldehyde reactant has been consumed in the acetalization reaction. The degree of substitution (DS) can be quantified by equation 2.

$$DS = \frac{A_1}{A_2/2} \qquad \text{Equation 2}$$

where $A_1$ is the area of the peak representing one vinyl proton and $A_2$ is the area of the peak representing one backbone proton.

Iodometric Titration Method for Measuring the Amount of Functional Vinyl Groups of the Acetal Compound Formed in the Acetalization Reaction Iodometric titration in this context refers to a method based on the Wijs method according to standard ISO 3961:2009(E) wherein a known excess of iodine monochloride is added to a sample, which results in a reaction between the iodine monochloride and any double bonds present in the sample. The quantity of iodine monochloride that has reacted with the double bonds present in the sample is determined by reacting the remaining residual iodine monochloride with a known excess of potassium iodide to form iodine, the stoichiometric quantity of which is then determined by titration with a solution of sodium thiosulphate of known concentration. From this, an iodine value of the sample is obtained that specifies the amount of grams of iodine that can formally be added to the double bonds in a known amount of the sample and from which the quantity of double bonds in the sample may then be determined. Vinyl groups are double bonds and low molecular weight polyvinyl alcohol, as such, does not contain double bonds. Therefore, iodometric titration is a specific method that can be used to investigate the amount of vinyl groups present in a sample of acetalized polyvinyl alcohol and to determine the vinyl group molality of the sample.

In particular, the iodometric titration method based on the Wijs method may be used to measure the total number of vinyl double bonds present in a sample obtained by acetalization of low molecular weight polyvinyl alcohol with an aldehyde that contains a functional vinyl group, such as 10-undecenal or 2,2'-dimethyl-4-pentenal. The iodometric titration method is based on a measured volume of iodine monochloride in acetic acid (Wijs solution) which may be added to the reaction solution containing the acetalized LMW-PVA, whereby the iodine monochloride reacts according to Equation 3 (below) with the double bonds of the vinyl groups present in the LMW-PVA that has been acetalized such that the electrophilic addition reaction produces a dihalogenated single bond, of which one carbon has bound an atom of iodine.

Equation 3

The iodine monochloride is a light-sensitive reagent and needs to be stored and incubated in the dark. After 1-hour incubation in the dark, the quantity of iodine that has reacted in the electrophilic addition reaction is determined by adding a measured volume of potassium iodide solution (15%, weight/volume) to the reaction solution, which causes the remaining unreacted iodine chloride in the reaction solution to form molecular iodine according to Equation 4 (below).

$$ICl+KI \rightarrow KCl+I_2 \qquad \text{Equation 4:}$$

The liberated molecular iodine is then titrated against a standard solution of 0.1 N sodium thiosulphate, whereby the stoichiometric quantity of molecular iodine may be calculated according to Equation 5 (below).

$$I_2+2Na_2S_2O_3 \rightarrow 2NaI+Na_2S_4O_6 \qquad \text{Equation 5:}$$

The iodometric titration thus enables to determine an iodine value, which is a measure of the amount of grams of iodine that have reacted with the functional vinyl groups in a known amount of the acetalized polyvinyl alcohol, as presented in Equation 6 (below).

$$\text{Iodine value} = \frac{(B-A)N \times 12,7 \frac{g}{100\ g}}{m} \qquad \text{Equation 6}$$

where A is thiosulfate consumption in milliliters of a test sample (acetalized polyvinyl alcohol that contains functional vinyl groups), B is thiosulfate consumption of a blank sample containing only the measured volume of iodine monochloride in acetic acid and the measured volume of potassium iodide solution, N is the normality (mol/l) of the thiosulfate solution and m is the mass in grams of the test sample (acetalized polyvinyl alcohol that contains functional vinyl groups). When the iodometric titration method is used to compare iodine values of multiple acetalized polyvinyl alcohol samples that contain functional vinyl groups, a sample containing only the low molecular weight polyvinyl alcohol used in the acetalization reaction may be used as a blank sample, instead. Blank samples containing only low molecular weight polyvinyl alcohols may also be used if the samples have been obtained from different types of low molecular weight polyvinyl alcohols.

The vinyl group molality $b_{vin}$ (mmol/g) can be determined according to Equation 7 (below), which equation is a simplified version obtainable from the Equation 6 (above):

$$b_{vin} = \frac{(B-A)N}{m} \quad \text{Equation 7}$$

As an example, when the thiosulfate consumption of a 2.5 g test sample of acetalized polyvinyl alcohol that contains functional vinyl groups in iodometric titration is 35 milliliters, the thiosulfate consumption of a blank sample is 48 milliliters and the normality of the thiosulfate solution is 0.1 mol/l, the vinyl group molality of the test sample is 0.52 mmol/g, as demonstrated below by using the formula of Equation 7:

$$\frac{(48 \text{ ml} - 35 \text{ ml}) \times 0,1 \text{ mol/l}}{2.5 \text{ g}} = 0.52 \frac{\text{mmol}}{\text{g}}$$

Below is provided an example method for measuring the quantity of functional vinyl groups from a reaction solution containing acetalized polyvinyl alcohol that contains functional vinyl groups, wherein the acetalized polyvinyl alcohol that contains functional vinyl groups has been obtained by reacting LMW-PVA with undecylenic aldehyde.

The reaction solution is first cleaned by purification, which comprises:
  collecting aqueous reaction solution containing the acetalized polyvinyl alcohol that contains functional vinyl groups,
  adding the aqueous reaction solution to acetone with constant stirring such that a 5:1 ratio of acetone to the aqueous reaction solution is reached, thereby obtaining a precipitate containing the acetalized polyvinyl alcohol that contains functional vinyl groups and a filtrate containing the undecylenic aldehyde which has not reacted,
  separating the precipitate from the filtrate by filtering, and drying the thereby obtained precipitate at 60° C. for 16 h, thereby obtaining an amount of dry acetalized polyvinyl alcohol that contains functional vinyl groups, which may be weighted to determine the mass of the dry acetalized polyvinyl alcohol that contains functional vinyl groups in grams.

The quantity of functional vinyl groups (i.e. the vinyl group molality) may then be measured by iodometric titration method, which comprises:
  adding a known mass of the dry acetalized polyvinyl alcohol that contains functional vinyl groups into distilled water such that a 10% (w/v) mixture is formed and stirring the mixture at ambient temperature or heating as necessary until a clear solution is obtained, thereby obtaining an aqueous solution containing the acetalized polyvinyl alcohol that contains functional vinyl groups,
  collecting a 25 ml aliquot of the aqueous solution containing the acetalized polyvinyl alcohol that contains functional vinyl groups into an empty flask
  adding 25 ml of iodine chloride in acetic acid (Wijs solution) into the aliquot, thereby obtaining a test sample solution
  adding 25 ml of iodine chloride in acetic acid (Wijs solution) into another flask containing 25 ml of distilled water, thereby obtaining a blank sample solution
  incubating the test sample solution and the blank sample solution in the dark for 1 h,
  adding 15 ml of potassium iodide solution (15%, w/v) into each of the test and blank sample solutions, respectively, while thoroughly stirring the solutions,
  adding starch as indicator and titrating the test and blank sample solutions with 0.1N sodium thiosulfate
  calculating the iodine value, which corresponds to the known mass of the dry acetalized polyvinyl alcohol that contains functional vinyl groups, and which is directly proportional to the quantity of functional vinyl groups present in the dry acetalized polyvinyl alcohol.

The starch indicator is added before the titration to visualize the end-point, which is observed as fading of the dark blue or purple color of the solution.

Determination of Average Molecular Weight

The $\overline{M}_w$ of LMW-PVA can be determined by gel permeation chromatography (GPC) combined with static light scattering. The average molecular weight is measured from re-acetylated specimens by methods known from the literature, for example in a pyridine/acetic anhydride mixture.

Viscosity Measurements

The term viscosity herein refers to a measure of the internal friction occurring in the displacement of two adjacent liquid layers, as defined in standard DIN 51 550. Viscosity is a property of a fluid that resists the force tending to cause the fluid to flow. Viscosity of a polymer solution is dominated by short-range attractive intermolecular forces within the solution. The viscosity behavior of a solution during a reaction may be measured with a viscometer. Unless otherwise stated, the values refer to viscosity η given in units of mPa·s (millipascal-second) according to the international system of units (SI). The viscosity values have been determined by using a Brookfield viscometer from aqueous solutions having a temperature of 25° C., according to the manufacturer's instructions.

Figure 6:
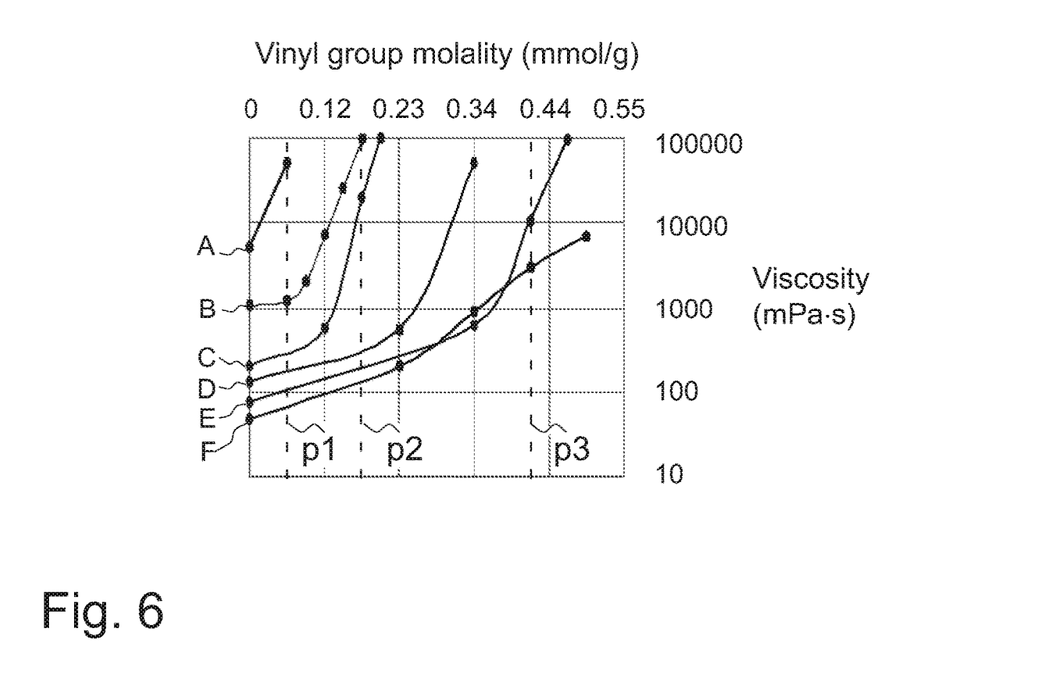
FIG. 6 is comparative experimental data demonstrating the effect of molecular weight to water-based acetalization reaction solution viscosity (mPa·s) and vinyl group molality (mmol/g), when 10-undecenal has been used as the reactant.

Comparative Experimental Data of the Effect of Molecular Weight of the Polymer to the Solution Viscosity Reference is made to FIG. 6, which illustrates the results of a comparative experimental study, wherein the viscosity was measured from water-based acetalization reaction products as a function of modification degree, using 10-undecenal as reactant. The vertical axis in FIG. 6 represents the viscosity value of the reaction mixture in millipascal-seconds (mPa·s) on a logarithmic scale. The horizontal axis in FIG. 6 represents the vinyl group molality $b_{vin}$ (mmol/g).

In the comparative experimental study, the viscosity η was measured as a function of the vinyl group molality $b_{vin}$ from reaction solutions denoted as samples A, B, C, D, E or F. Each sample A, B, C, D, E and F contained polyvinyl alcohol of a specific grade. The specific grade refers to the degree of hydrolysis and the degree of polymerization of the polyvinyl alcohol. Table 2 (below) discloses the characteristics of the grades of polyvinyl alcohol used in samples A-F. Samples A, B, C, D and E represented fully hydrolyzed grades having a degree of hydrolysis equal to or higher than 97%, whereas sample F was a partially hydrolyzed grade having a degree of hydrolysis of 88%, respectively. All samples thereby contained functional hydroxyl groups. Different grades of polyvinyl alcohol were selected to compare the effect of the polymer grade to the solution viscosity during a water-based acetalization reaction with the same reactant (10-undecenal). Sample A was a reference sample containing commercial polyvinyl alcohol with a degree of hydrolysis of 98%, the degree of polymerization $\overline{PW}$ of ca. 2800 and an $\overline{M}_w$ of ca. 125000 g/mol.

TABLE 2

$\overline{M}_w$ (g/mol) and degree of polymerization $\overline{P}_w$ of the polyvinyl alcohol grades used in the comparative experimental study.

| Sample | $\overline{M}_w$ (g/mol) | $\overline{P}_w$ |
|--------|--------------------------|------------------|
| A | 125000 | 2800 |
| B | 61000 | 1400 |
| C | 47000 | 1000 |
| D | 27000 | 600 |
| E | 16000 | 360 |
| F | 14000 | 270 |

Each sample A-F was prepared in the same manner by mixing polyvinyl alcohol into water and heating and stirring the mixture for 2 hours at 90° C. until a solution was obtained that contained a 12% solids content (i.e. dry matter content) and subsequently adjusting the pH of the solution with sulfuric acid. The pH of the solution was measured to be 1.5 prior to adding 10-undecenal, which was used as the reactant for the water-based acetalization reaction. The solution was stirred vigorously during the synthesis to ensure a reaction with the reactant, which was not water-soluble. The synthesis was continued for 25 minutes at a temperature of 90° C. and the pH was then adjusted to 7 by adding sodium hydroxide (1M solution). The solution containing the reaction product was subsequently allowed to cool down to room temperature before measurement of the viscosity of the sample thus prepared.

The viscosity was measured from the samples A-F at different vinyl group molalities, which correlated with the amount of the reactant that was reacted with the polyvinyl alcohol. As an example, sample B at a vinyl group molality of 0.09 mmol/g correlates with a 1.5 wt.-% degree of modification.

As can be observed from FIG. 6, when the polyvinyl alcohol was unmodified, the viscosity of samples A and B was already ca. 1000 mPa·s or higher. This was likely due to the relatively high $\overline{M}_w$ of over 60000 g/mol and relatively high degree of polymerization $\overline{P}_w$ of ca. 1400 or higher.

The leftmost dashed vertical line p1 denotes a sample with a vinyl group molality of 0.06 mmol/g. At this degree of modification, the viscosity of sample A was already 50000 mPa·s, whereas the viscosity of sample B was ca. 1200 mPa·s.

Next to the dashed vertical line p1, the vertical line denotes a vinyl group molality of 0.12 mmol/g. At this degree of modification, the viscosity of sample A was too high for measurement. The viscosity of sample B had also increased rapidly and was already around 7200 mPa·s, which had a significant effect on the flow behavior of the solution. When the degree of modification of sample B was 0.15 mmol/g. the viscosity of the solution had already risen to 26000 mPa·s, which rendered the sample unsuitable for coating on a cellulose fiber-based support layer by conventional means used in the industry.

The dashed vertical line p2 denotes a vinyl group molality of 0.17 mmol/g. At this degree of modification, the viscosity of sample B was already ca. 100000 mPa·s and the viscosity of sample C was already ca. 20000 mPa·s.

The dashed vertical line p3 denotes a vinyl group molality of 0.42 mmol/g. At this degree of modification, the viscosity of fully hydrolyzed sample E was already above 10000 mPa·s. The viscosity of the partially hydrolyzed sample F, on the other hand, was ca. 3000 mPa·s.

The comparative experimental study demonstrates how the viscosity η behaved as a function of vinyl group molality in the samples A-F, when 10-undecenal was used as a reactant. The examples 1 and 2 below illustrate in practice how the invention may be carried out and present some advantageous effects that the use of low molecular weight polyvinyl alcohol may provide on a paper substrate primer layer.

Example 1: Grafting of Low-Molecular Weight PVA with High Vinyl Group Molality In an experimental study, 14.4 grams of low-molecular weight PVA ($\overline{M}_w$=16000 g/mol, $\overline{P}_w$=360) was dissolved into 105.6 grams of water having a temperature of 90° C., such that a clear aqueous solution was obtained. The pH value of the aqueous solution was then adjusted to 2 with sulfuric acid. Subsequently, an amount of 1.22 grams of 10-undecenal was added dropwise into the solution as a reactant while agitating the solution vigorously. The agitation was continued for 90 min at the temperature of 90° C., thereby reacting the reactant with the dissolved low-molecular weight PVA in a water-based acetalization reaction. The pH of the reaction mixture was then adjusted to a pH value 7 with sodium hydroxide, and the reaction mixture was allowed to cool down to ambient temperature of 25° C. The vinyl group molality of the formed acetalized polyvinyl was 0.47 mmol/g and Brookfield viscosity of the solution at 25° C. was 69 mPa·s, when measured at 100 rpm.

The experimental study was then repeated, but this time using a commercial polyvinyl alcohol grade (POVAL® 10-98, $\overline{M}w$ 61000 g/mol) such that the vinyl group molality of the acetalized polyvinyl alcohol was 0.09 mmol/g and Brookfield viscosity of the solution at 25° C. was 2000 mPa·s, when measured at 100 rpm.

Example 2: Effect of Increased Vinyl Content to the Relative Rub-Off Value of a Paper Substrate In order to study the effect of vinyl group molality to silicone adhesion, a comparative experimental study was performed on samples containing two kinds of polyvinyl alcohol grades grafted with 10-undecenal which had been prepared according to Example 1 above. Unmodified polyvinyl alcohol (POVAL® 10-98 grade) served as a reference sample, which could be used as a negative control to determine the effect of the unmodified polyvinyl alcohol on the silicone adhesion. Anchorage is a term used in the field to describe the attachment of the release coating to the paper substrate. Anchorage may be measured as relative rub-off of the silicone from the paper substrate. A relative rub-off value of 100% refers to a perfect anchorage of the silicone, such that the release coating is fully anchored to the substrate. A relative rub-off value of less than 90% means that the release coating could not hold on to the paper substrate sufficiently.

In the experimental study, aqueous solutions were thus prepared, which contained either

- unmodified polyvinyl alcohol (the reference sample)
- the same polyvinyl alcohol, but grafted with 10-undecenal, such that the grafted polyvinyl alcohol contained a vinyl group molality $b_{vin}$ of 0.09 mmol/g, or
- modified low molecular weight polyvinyl alcohol prepared according to example 1 such that the acetalized polyvinyl alcohol contained a vinyl group molality $b_{vin}$ of 0.47 mmol/g.

Glassine paper sheets (UPM Golden) were coated with the aqueous PVA solutions using a laboratory blade coater, thereby obtaining paper substrates with a primer layer that contained either unmodified commercial polyvinyl alcohol grade without vinyl groups, modified commercial polyvinyl alcohol with a vinyl group molality of 0.09 mmol/g or modified low molecular weight polyvinyl alcohol, which contained a vinyl group molality of 0.47 mmol/g. The amount of coating applied on each glassine paper sheet was 2 g/m². After coating, the paper substrates thus prepared were dried at 105° C. for 1 minute. All paper substrates were subsequently subjected to siliconization, which refers to coating of a paper substrate with silicone resin prepared of Wacker Dehesive SFX 251 and V525 cross-linker, using C05 catalyst (all components provided by Wacker). The silicone resin applied on the paper substrate was prepared by stirring 100 parts per weight of the Dehesive SFX 251 with 14.4 parts of the V525 cross-linker for 2 minutes, then adding 1 part of the C05 platinum catalyst and stirring for 5 minutes. Thus, the amount of platinum in the formed silicone resin was 10 ppm. The silicone resin thus prepared was then applied on top of the paper substrate by blade coater and cured for 30 seconds at 105° C., thereby curing the silicone resin into a release layer and forming a release liner. Each paper substrate was coated with an amount of 1.2 g/m² of the silicone resin thus prepared. The silicone adhesion was tested immediately after the siliconization from the formed release liner. This is referred to as the initial rub off level. To further observe the combined effect of tropical conditions and label adhesive as a function of time to the silicone adhesion level, an adhesive label was attached on each formed release liner immediately after siliconization and the laminates thus formed were stored at 50° C. and 70% RH for a period of 2 and 7 days before determining the silicone adhesion level again.

The level of silicone adhesion in each release liner sample was determined with a semi-automatized method, wherein the amount of silicone was measured using an x-ray fluorescence spectrometer (Oxford Lab-X-3000) before and after a defined amount of rubbing of the release liner sample. The release liner sample was placed on top of a felt, such that the siliconized surface of the release liner sample was facing the felt. The rubbing was performed by pressing the sample with constant pressure against a felt and rotating the sample 10 times around its axis, in order to increase reliability and comparability of the result. In the case of 2- and 7-day measurements, the release liner was tested after removing the label from the laminate. Thus the 2- and 7-day measurements were performed on surfaces that had been in contact with an adhesive. For each sample, 3 parallel rub-off measurements were performed, of which the arithmetic average was calculated. The results of the rub-off tests are shown in Table 4 (below), wherein the values are the calculated arithmetic average values, given in units of relative rub-off value in percent (%). A relative rub-off value of 90% represents a minimum level which is considered to be acceptable and a relative rub-off value of 95% or above is considered as a good result. An example of a device suitable for producing rub-off on a release liner surface is a Satra rub tester, which has a rotating head holding a circular felt pad under a standard load, which enables semi-automated testing of abrasion resistance of a release layer.

TABLE 4

Silicone rub-off test results of release liner samples formed of paper substrates containing either unmodified commercial polyvinyl alcohol grade without vinyl groups, modified commercial polyvinyl alcohol with a vinyl group molality of 0.09 mmol/g or a modified low molecular weight polyvinyl alcohol, which contained a vinyl group molality of 0.47 mmol/g. The release coating applied on the paper substrate was a fast curing silicone system (SFX251 dehesive, V525 cross-linker) wherein the amount of platinum was 10 ppm.

| sample type | vinyl group molality (mmol/g) | relative rub-off value (%) | | |
|---|---|---|---|---|
| | | 0 d | 2 d | 7 d |
| unmodified PVA | 0 | 10 | 9 | 10 |
| modified PVA | 0.09 | 15 | 7 | 9 |
| modified low-molecular weight PVA | 0.47 | 98 | 98 | 101 |

The results of the experimental study demonstrated that the unmodified commercial polyvinyl alcohol grade (Poval® 10-98) having $\overline{M}_w$ of 61000 g/mol could be grafted in a water-based acetalization reaction to a vinyl group molality of 0.09 mmol/g. This amount of vinyl groups grafted onto a polymer, however, was not sufficient to provide reliable anchorage for fast-curing silicones, which may be used at low levels of platinum catalyst. The low molecular weight polyvinyl alcohol, on the other hand, enables a much higher vinyl group molality to be obtained on the acetalized polyvinyl alcohol. The test results further demonstrate that a primer layer based on modified low molecular weight polyvinyl alcohol worked much better with the fast curing silicone. The release liner sample containing modified low molecular weight polyvinyl alcohol presented good relative rub-off values, which remained relatively consistent over time, unlike the samples containing the commercial polyvinyl alcohol grade. In view of the test results, the paper substrate containing low molecular weight polyvinyl alcohol demonstrated a surprisingly large difference in silicone adhesion levels, when relative rub-off was measured, and thus provided better anchorage capability for the silicone system. A low molecular weight polyvinyl alcohol thus enabled the use of a fast curing silicone resin with a very low platinum level.

High-Speed Release Value

The release value of a release layer may be determined by means of an adhesion test, for example by using the FINAT test methods FTM3 for low speed release force and FTM4 for high speed release force (FINAT handbook 9$^{th}$ edition, 2014). A release value in this context represents the minimum amount of force required to separate adhesive material, which has been brought into contact with the release layer surface, from the surface. In other words, when the adhesive material in contact with the release layer surface is subjected to a pulling force for removing the adhesive material, release value represents the amount of force resisting such pulling force in given conditions. The unit of the high-speed release value is expressed in centiNewtons (cN).

Reference is made to FIG. 3. A particular advantage of a hydrophobic surface is that less adhesive may penetrate through a release layer into the primer layer beneath, when the paper substrate is used for a release liner. A primer layer PRIM1 having a hydrophobic surface or barrier may be arranged to repel the adhesive. Thus, also the minimum amount of force $F_N$ required to detach a label LAB1 or excess matrix material MTX1 is reduced. A further effect of the hydrophobic surface on the cellulose fiber-based support layer PAP1 is that this enables the thickness of the release layer SIL1 to be reduced, since the minimum amount of force $F_N$ required to detach a label LAB1 from the release liner REL1 is dependent of the thickness of the release layer SIL1. The hydrophobic surface therefore facilitates the reduction of the amounts of silicone and platinum required for providing a release layer SIL1. A thinner release layer SIL1 further enables a lower high-speed release value. The silicone-based release layer may thereby remain thin, such as less than 1 micrometer in thickness. A thinner release layer enables also reduction of the thickness of the cellulose fiber-based support layer, which is needed to support the release layer and give strength. The release value is therefore dependent of the behavior of the whole release liner wherein both the paper substrate and the viscoelastic behavior of the release layer determine the release properties. A particular advantage of a primer layer that contains catenated carbon structures and wherein the vinyl group molality $b_{vin}$ of the acetalized polyvinyl alcohol is equal to or higher than 0.23 millimoles per gram, preferably equal to or higher than 0.28 millimoles per gram, most preferably equal to or higher than 0.55 millimoles per gram of the acetalized polyvinyl alcohol is that the higher amount of functional vinyl groups enables the use of very fast curing silicone compounds in the release coating.

Figure 7:
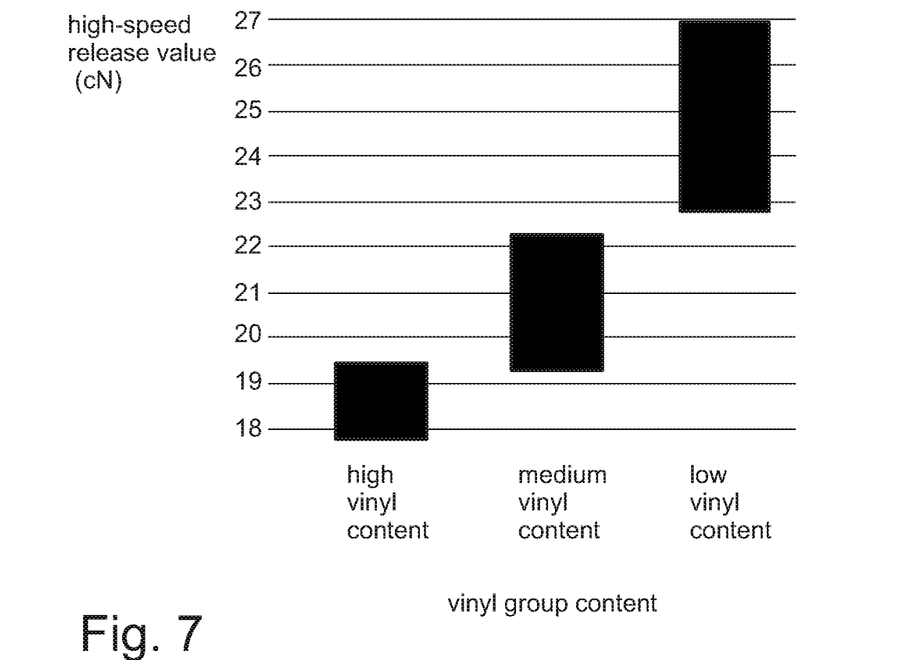
FIG. 7 illustrates, by way of an example, the correlation between vinyl group content of a paper substrate surface and the high-speed release value of a release liner manufactured from the paper substrate.

Reference is made to FIG. 7, which illustrates, by way of an example, the correlation between the vinyl group content of a paper substrate surface and the high-speed release value of a release liner manufactured from the paper substrate.

In the example, high speed release value was measured from three sets of release liner samples, referred to as high vinyl content samples, medium vinyl content samples and low vinyl content samples. Each set was manufactured by coating the same type of cellulose fiber-based support layer (UPM Golden 56 g/m$^2$) with the same amount of modified low molecular weight PVA (1.7 g/m$^2$). The coating was performed using a pilot coater. After coating, the samples were remoisturized and supercalendered, thereby forming paper substrates suitable for release liner. Low platinum content silicone SFX251 from Wacker was used as a release coating for all samples, in the same amount (1.2 g/m$^2$). The parameter that was varied between the three sets was therefore the molality of vinyl functional groups present in the primer layer surface of the paper substrates, prior to coating the paper substrates with the same amount of release coating. The molality of the low vinyl content samples was less than 0.1 mmol/g, referring to the amount of vinyl functional groups on the paper substrate prior to forming the release liner. This was the set comprising the lowest amount of vinyl groups on the paper substrate and represented a conventional molality level of vinyl functional groups obtainable on a paper substrate that comprises commercial polyvinyl alcohol grade which has been modified with 10-undecenal. The molality of the medium vinyl content samples was in the range of 0.2 to 0.3 mmol/g, referring to the amount of vinyl functional groups on the paper substrate prior to forming the release liner. The molality of the high vinyl content samples was between 0.3 and 0.6 mmol/g, referring to the amount of vinyl functional groups on the paper substrate prior to forming the release liner. The adhesion test was performed on the samples according to FTM4, which measures the high-speed release force. In the adhesion test, the same surface liner having the same water based adhesive layer and polypropylene face material (50 g/m$^2$) was used for all samples. Therefore, the variable parameter between the samples measured was the primer layer, which contained different amount of functional vinyl groups, while the other parameters in the adhesion test were maintained unchanged.

Figure 8:
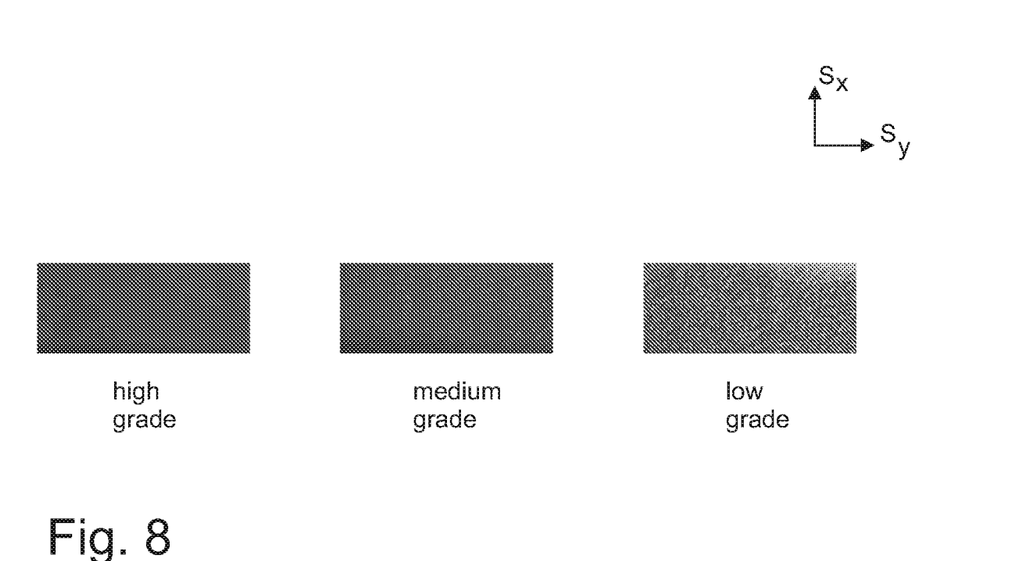
FIG. 8 is a series of bird's-eye view photographs taken from unwinded polypropylene label laminate samples, which show how the vinyl group content on the paper substrate may be used to control the print quality of the face material.

The adhesion test results have been presented in FIG. 7. The results indicate, that the amount of vinyl groups on the surface of the primer layer, prior to forming the release layer on the paper substrate, correlates with the high-speed release value of the release liner formed of the same paper substrate. The high-speed release value of the low vinyl content samples was in the range of 22.8 to 27 cN. The high-speed release value of the medium vinyl content samples was less than 22.5 cN, in the range of 19.2 to 22.3 cN. The high-speed release value of the high vinyl content samples was less than 19.5 cN, in the range of 17.8 to 19.4 cN. Acetalized polyvinyl alcohol which contains a vinyl group molality $b_{vin}$ equal to or higher than 0.2 mmol/g on a primer layer may thus be used for reducing the high-speed release value of a release liner. This may be used to reduce the base weight (grammage) of the paper used in high-speed release liner applications, both in the paper substrates and in the face material. This also facilitates the manufacturing of a release liner which has a low and stable high-speed release value Migration Phenomenon Reference is made to FIG. 8, which is a series of bird's-eye view photographs taken from unwinded polypropylene label laminate samples, which show how the vinyl group content on the paper substrate may be used to control the print quality of the face material. The label laminate samples were manufactured on release liner samples from the previous example (low, medium and high vinyl content samples). Before the print adhesion tests, all samples were stored for 3 months under standard conditions (23° C. and RH 50%). All samples were printed with the same laboratory flexo printer using the same blue color. Each photograph in FIG. 8 represents a printed polymeric face material on a release liner comprising a paper substrate (glassine paper) with either high amount of vinyl groups (high grade), medium amount of vinyl groups (medium grade) or low amount of vinyl groups (low grade). The printed surfaces show differences in print adhesion, which difference is visible in the photographs as lighter areas ('white spots') in the otherwise dark print surface. The lighter areas are an indication of undesirable print quality variation in the face material. The amount of the lighter areas in the printed polypropylene face material correlates inversely with the initial amount of vinyl group content of the paper substrate (underneath the face material). The lighter areas were visible in particular in samples wherein the paper substrate contained low amount of vinyl groups (low grade) and indicate that the print quality is reduced in such face materials. The paper substrate containing medium amount of vinyl groups (medium grade) had significantly less of the lighter areas such that the blue color intensity was distributed more evenly. In the paper substrate containing the highest amount of vinyl groups (high grade), the least amount lighter areas appeared, which indicates that the amount of vinyl groups covalently bound to the paper substrate correlates with the capability of the paper substrate to bind unreacted silicone cross-linker compound. Unreacted silicone cross-linker on the release liner surface is the most likely cause of poor print adhesion observed, as silicone cross-linker compounds conventionally used in release coatings may migrate through the paper substrate on the reel to the face material underneath. FIG. 8 photographs thus evidence that the unreacted cross-linker, which in the photographs is indicated by the lighter areas, directly affects the printability of the face material, as the ink-adhesion is interfered by the unreacted cross-linker compound on the surface.

For the person skilled in the art, it will be clear that modifications and variations of the paper substrate and the method according to the present invention are perceivable. The FIGS. 1-5 are illustrative and have not been drawn into any particular scale. Any particular examples described above with reference to the accompanying drawings are illustrative only and not meant to limit the scope of the invention, which is defined by the appended claims.

The invention claimed is:

1. A paper substrate which is suitable for binding silicone in a catalytic hydrosilation reaction, the paper substrate comprising
   a cellulose fiber-based support layer and
   a hydrophobic primer layer that contains acetalized polyvinyl alcohol, wherein the acetalized polyvinyl alcohol has a weight average molecular weight of less than 50000 g/mol, and
   contains a vinyl group molality which is equal to or higher than 0.2 millimoles per gram of the acetalized polyvinyl alcohol, and wherein
   the functional vinyl groups are part of catenated carbon structures which contain at least 4 carbon atoms, and which have an acetal connectivity with the backbone chain of the acetalized polyvinyl alcohol.

2. The paper substrate according to claim 1, wherein the catenated carbon structure is a linear hydrocarbon that terminates into a functional vinyl group at the other end of the chain.

3. The paper substrate according to claim 1, wherein the catenated carbon structures contain at least 5 carbon atoms.

4. The paper substrate according to claim 1, wherein the vinyl group molality of the acetalized polyvinyl alcohol is equal to or higher than 0.23 millimoles per gram of the acetalized polyvinyl alcohol.

5. The paper substrate according to claim 1, wherein the vinyl group molality of the acetalized polyvinyl alcohol is in the range of 0.20 to 1.41 millimoles per gram of the acetalized polyvinyl alcohol.

6. The paper substrate according to claim 1, wherein the cellulose fiber-based support layer is made of bleached chemical pulp.

7. A method for manufacturing a paper substrate which is suitable for binding silicone in a catalytic hydrosilation. reaction, the method comprising steps of
   dissolving polyvinyl alcohol which has a weight average molecular weight of less than 50000 g/mol and degree of hydrolysis in the range of 70% to 99% into water, thereby obtaining a water-based solution containing dissolved polyvinyl alcohol,
   adding reactant which is an organic molecule that contains a catenated carbon structure having at least 4 carbon atoms, an aldehyde group and a functional vinyl group into the water-based solution containing the dissolved polyvinyl alcohol, thereby obtaining a reaction mixture
   reacting the reactant with the dissolved polyvinyl alcohol in a water-based acetalization reaction, thereby forming acetalized polyvinyl alcohol which contains functional vinyl groups, wherein the functional vinyl groups are part of catenated carbon structures which contain at least 4 carbon atoms, and which have an acetal connectivity with the backbone chain of the acetalized polyvinyl alcohol, and
   coating a cellulose fiber-based support layer with the acetalized polyvinyl alcohol, thereby forming a hydrophobic primer layer and the paper substrate, wherein the vinyl group molality of the acetalized polyvinyl alcohol is equal to or higher than 0.2 millimoles per grain of the acetalized polyvinyl alcohol.

8. The method according to claim 7, wherein the viscosity of the reaction mixture containing the acetalized polyvinyl alcohol is less than 8000 mPa s after the water-based acetalization reaction.

9. The method according to claim 7, further comprising removing unreacted reactant from the reaction mixture containing acetalized polyvinyl alcohol.

10. The method according to claim 7, wherein the dry matter content of the polyvinyl alcohol in the water-based solution is equal to or higher than 25 wt.-% .

11. The method according to claim 7, wherein the polyvinyl alcohol is partially hydrolyzed, such that the degree of hydrolysis of the polyvinyl alcohol is less than 97%.

12. The method according to claim 7, wherein the polyvinyl alcohol is fully hydrolyzed, such that the degree of hydrolysis of the polyvinyl alcohol is equal to or more than 97%.

13. The method according to claim 7, wherein the organic molecule is 10-undecenal or 2,2'-dimethyl-4-pentenal.

14. The method according to claim 7, wherein the acetalized polyvinyl alcohol has a weight average molecular weight of less than 5000 g/mol.

15. The method for manufacturing a paper substrate according to claim 7, wherein the catenated carbon structure is a linear hydrocarbon that terminates into a functional vinyl group at the other end of the chain.

16. The method for manufacturing a paper substrate according to claim 7, wherein the catenated carbon structures contain at least 5 carbon atoms.

17. The method for manufacturing a paper substrate according to claim 7, wherein the vinyl group molality of the acetal.ized polyvinyl alcohol is equal to or higher than 0.23 millimoles per gram of the acetalized polyvinyl alcohol.

18. The method for manufacturing a paper substrate according to claim 7, wherein the vinyl group molality of the a.cetaliz,ed polyvinyl alcohol is in the range of 0.20 to 1.41 m millimoles per gram of the acetalized polyvinyl alcohol.

19. The method for manufacturing a paper substrate according to claim 7, wherein the cellulose fiber-based support layer is made of bleached chemical pulp.

20. A release liner which comprises a paper substrate according to claim 1 and a release layer based on a silicone compound that has been applied on the paper substrate.

* * * * *